United States Patent [19]

Miyakawa

[11] Patent Number: 4,931,781
[45] Date of Patent: Jun. 5, 1990

[54] CURSOR MOVEMENT CONTROL KEY SWITCH

[75] Inventor: Akira Miyakawa, Tokyo, Japan

[73] Assignee: Canon Kabushiki Kaisha, Tokyo, Japan

[21] Appl. No.: 16,480

[22] Filed: Feb. 17, 1987

Related U.S. Application Data

[63] Continuation of Ser. No. 462,077, Jan. 28, 1983, abandoned.

[30] Foreign Application Priority Data

| Feb. 3, 1982 | [JP] | Japan | 57-14770 |
| Apr. 28, 1982 | [JP] | Japan | 57-70205 |
| Jun. 30, 1982 | [JP] | Japan | 57-111470 |
| Jul. 28, 1982 | [JP] | Japan | 57-130418 |
| Jul. 28, 1982 | [JP] | Japan | 57-130419 |
| Jul. 28, 1982 | [JP] | Japan | 57-130420 |
| Jul. 28, 1982 | [JP] | Japan | 57-130421 |
| Jul. 29, 1982 | [JP] | Japan | 57-131188 |
| Jul. 29, 1982 | [JP] | Japan | 57-131189 |

[51] Int. Cl.⁵ .................................. G09G 3/02
[52] U.S. Cl. .................................. 340/706; 340/709; 340/711; 200/5 R; 200/18; 341/22
[58] Field of Search .................. 340/709–712, 340/706, 365 A, 365 R; 200/5 R, 6BB, 18, 176, 177

[56] References Cited

U.S. PATENT DOCUMENTS

| 3,729,129 | 4/1973 | Fletcher et al. | 340/709 |
| 4,092,532 | 5/1978 | Heyes | 340/710 |
| 4,148,014 | 4/1979 | Burson | 340/709 |
| 4,313,113 | 1/1982 | Thornburg | 340/365 A |
| 4,382,166 | 5/1983 | Kim | 200/18 |
| 4,475,015 | 10/1984 | Kobayashi et al. | 200/5 R |

OTHER PUBLICATIONS

*IBM Technical Disclosur Bulletin*, vol. 8, No. 8, Jan. 1966, "Keyboard", J. A. Toris p. 1064.

*Primary Examiner*—David K. Moore
*Assistant Examiner*—Richard Hjerpe
*Attorney, Agent, or Firm*—Fitzpatrick, Cella, Harper & Scinto

[57] ABSTRACT

A cursor movement control key switch for controlling movement of a cursor on a display screen of a CRT or the like requires only one key. Operation of a single key allows both control of the direction of the cursor, and control of brightness of the display, volume level of sounds at a speaker, a display size of the cursor or the like. A CPU periodically detects the states of signals at terminals corresponding to contacts disposed in the key switch so as to produce signals to perform the above control operations. The key switchy provides improved operability.

4 Claims, 23 Drawing Sheets

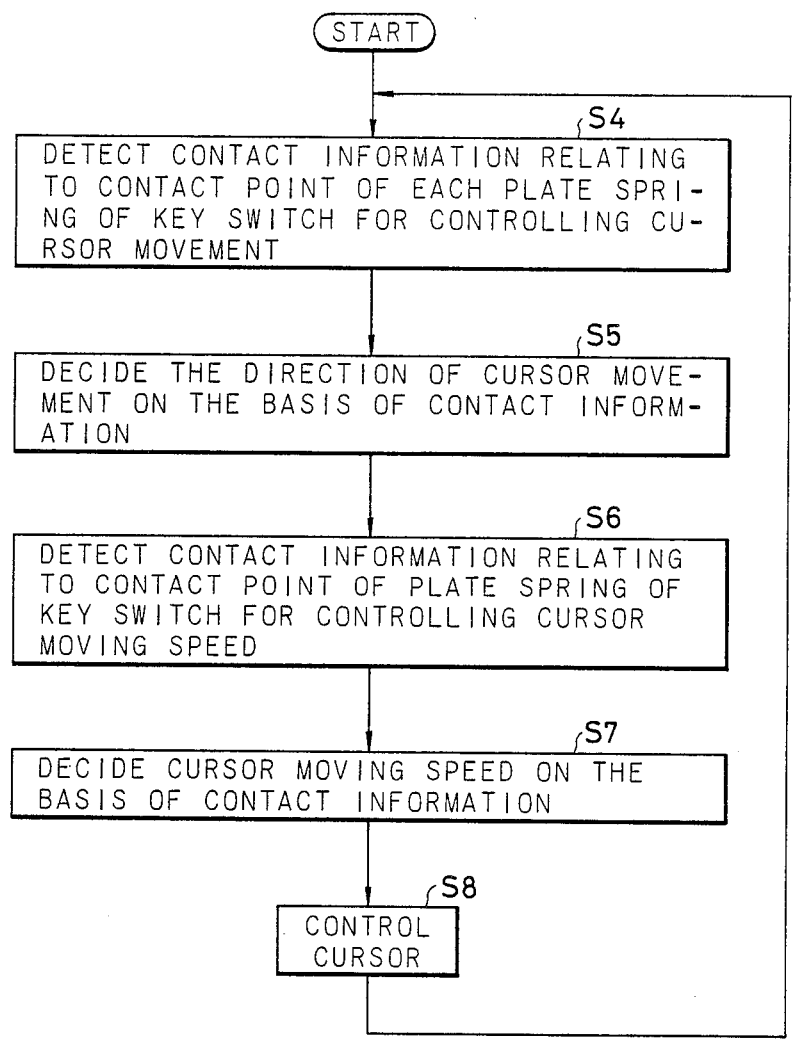

CURSOR MOVEMENT CONTROL KEY SWITCH

This is a request for filing a continuation application, under 37 CFR 1.62 of prior application Ser. No. 462,077 filed on Jan. 28, 1983 currently entitled CURSOR MOVEMENT CONTROL KEY SWITCH.

BACKGROUND OF THE INVENTION

1. Field of the Invention

The present invention relates to a cursor movement control key switch for moving a cursor displayed on a display screen of a CRT or the like.

2. Description of the Prior Art

As one of various means for changing the display position of a cursor on a CRT screen, a set of four cursor movement key switches is known which respectively allow movement of the cursor in the vertical (upward and downward) and horizontal (to the right and left) directions. The cursor movement key switches of this type are particularly prevalent in general purpose computers since they are inexpensive and simple in structure.

When a display position of a cursor on a screen is to be changed using such key switches, an up key having an upward arrow, for example, is depressed to move the cursor vertically upward. Then, a left key may be depressed to move the cursor to the left.

The difficulty in operating these four key switches to designate a plurality of directions of movement of the cursor on the screen may be confirmed by playing a game using a personal computer or the like. In order to be able to move the cursor quickly in a maze involving rectangular paths, one must have considerable skill in operating the key switches.

Although a set of four cursor movement key switches as described above functions relatively well, it does not necessarily guarantee optimal ease of operation as noted above. Furthermore, if the direction of movement of the cursor must be sequentially changed to reach a target position, the corresponding key switches must be sequentially depressed. This does not allow smooth movement of the cursor and results in a time-consuming operation.

SUMMARY OF THE INVENTION

The present invention has been made in view of the above problem and has for its object to provide a cursor movement control key switch which allows easy and fast movement of a cursor and which requires only one key to move the cursor to a desired position.

It is another object of the present invention to provide a cursor movement control key switch which has improved operability when the cursor must be moved in a plurality of directions to reach a desired position.

It is still another object of the present invention to provide a cursor movement control key switch in which the direction of movement of a cursor may be selected by sliding the key switch in the horizontal direction, and a change in the moving speed of the cursor may be easily effected by depressing the key top of the same key.

It is still another object of the present invention to provide a cursor movement control key switch in which movement of a cursor and designation of a function may both be performed with a single key.

It is still another object of the present invention to provide a cursor movement control key switch which may be switched between the cursor movement mode and the function designation mode.

It is still another object of the present invention to provide a cursor movement control key switch in which movement of a cursor and control of a cursor display size may both be performed with a single key.

It is still another object of the present invention to provide a cursor movement control key switch in which movement of a cursor and control of the volume of output of a speaker section may both be performed with a single key.

It is still another object of the present invention to provide a cursor movement control key switch in which movement of a cursor and selection between high and low speed movement of the cursor may both be performed with a single key.

It is still another object of the present invention to provide a cursor movement control key switch in which movement of a cursor and control of brightness of a display portion may both be performed with a single key.

BRIEF DESCRIPTION OF THE DRAWINGS

FIG. 17 shows a control flowchart of the switch shown in FIGS. 14(A) to 14(D);

DETAILED DESCRIPTION OF THE PREFERRED EMBODIMENTS

Preferred embodiments of the present invention will now be described with reference to the accompanying drawings.

Figure 1:
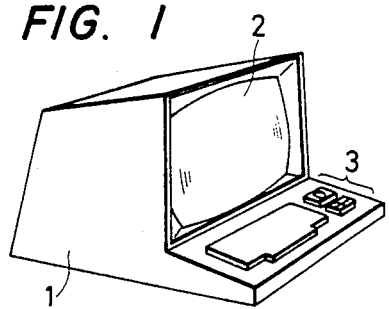
FIG. 1 is a perspective view of a personal computer having a cursor movement control key switch according to a first embodiment of the present invention.
Figure 2:
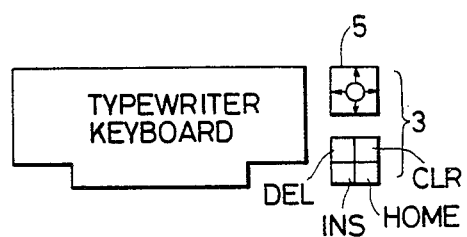
FIG. 2 is an enlarged plan view of the keyboard of the personal computer shown in FIG. 1.
Figure 8A:
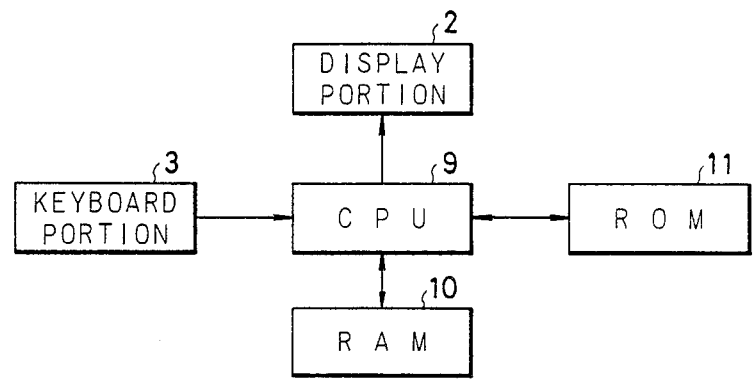
FIG. 8(A) is a block diagram of a personal computer having a cursor movement control key switch according to the first embodiment of the present invention.

FIG. 1 is a perspective view of a personal computer having a cursor movement control key switch according to a first embodiment of the present invention. A main body 1 of the personal computer houses a CPU 9 for controlling the cursor movement, a ROM 11 for storing a control program for the CPU 9, and a RAM 10 to be used by the CPU 9, as shown in FIG. 8A. A display portion 2 and a keyboard portion 3 are arranged on the outer top surface of the main body 1. FIG. 2 is a detailed plan view of the keyboard portion 3 including a cursor movement control key switch 5.

Figure 3:
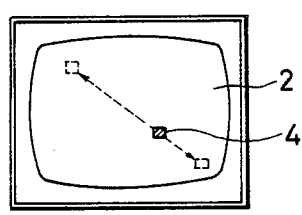
FIGS. 3 and 4 are representations for explaining the mode of operation of the cursor movement control key switch shown in FIG. 1.
Figure 4:
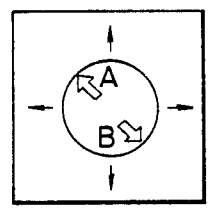
Figure 6A:
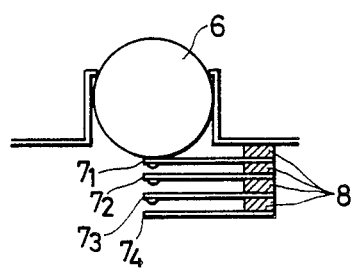
FIGS. 6(A) and 6(B) are partial detailed views of plate spring contacts.
Figure 6B:
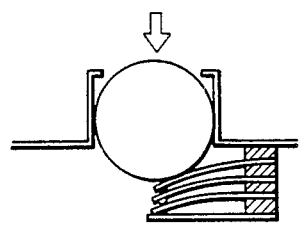
Figure 5A:
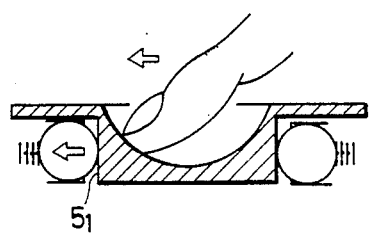
FIG. 5(A) is a sectional view of a cursor movement control key switch according to the first embodiment of the present invention.
Figure 5B:
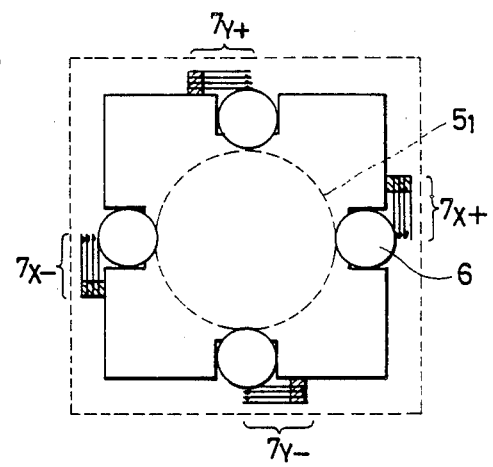
FIG. 5(B) is a top plan view of the same.

The process of moving a cursor 4 on the display portion 2 diagonally toward the top left or the bottom right by mean of the cursor movement control key switch 5 of the first embodiment of the present invention, as shown in FIG. 3 will now be described. As shown in FIG. 4, the cursor movement control key switch 5 is simply depressed or shifted diagonally to the top left (arrow A) or diagonally to the bottom right (arrow B) so as to move the cursor 4. If one wishes to move the cursor 4 quickly, one need only to strongly depress or shift the cursor movement control key switch 5 in the desired direction. As shown in FIGS. 5(A) and (B), and 6(A) and 6(B), in the cursor movement control key switch 5, spherical pressure balls 6 and plate spring contacts $7_{x+}$, $7_{x-}$, $7_{y+}$ and $7_{y-}$ are arranged around a key top $5_1$. Each plate spring contact includes plate spring contacts $7_1$ to $7_4$ which are isolated by insulators 8. As the force acting on the key top $5_1$ increases, the plate spring contacts $7_1$ to $7_4$ contact each other in the order named. Then, the information relating to the contact conditions of the plate spring contacts $7_1$ to $7_4$ is detected by the CPU 9 shown in FIG. 8(A). On the basis of the contact information, the CPU 9 determines or detects the direction and speed of movement of the cursor 4 by referring to the ROM 11, which stores information on the direction and speed of movement of the cursor.

Figure 8B:
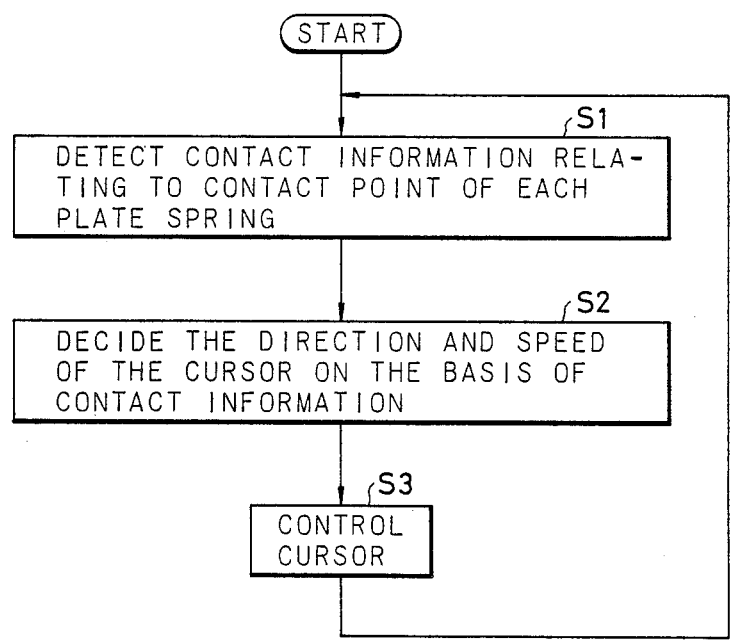
FIG. 8(B) is a control flowchart therefor.

When the cursor movement control key switch 5 is moved in the direction corresponding to no one of the plate spring contacts $7_{x+}$, $7_{x-}$, $7_{y+}$ and $7_{y-}$ (e.g., in the direction indicated by arrow A in FIG. 4), depressing force acts both on plate spring contacts, for example, $7_{x-}$ and $7_{y+}$. In this case, the components of force in the X- and Y-axis directions respectively act on the plate spring contacts $7_{x-}$ and $7_{y+}$ according to the parallelogram law. Then, the CPU 9 detects the ratio of the components of force. The CPU 9 determines the direction of movement of the cursor 4 to be made by referring to the ROM 11 which stores the information on the direction and speed of movevent of the cursor 4. The flow of the cursor control by the CPU 9 is shown in FIG. 8(B).

Figure 9:
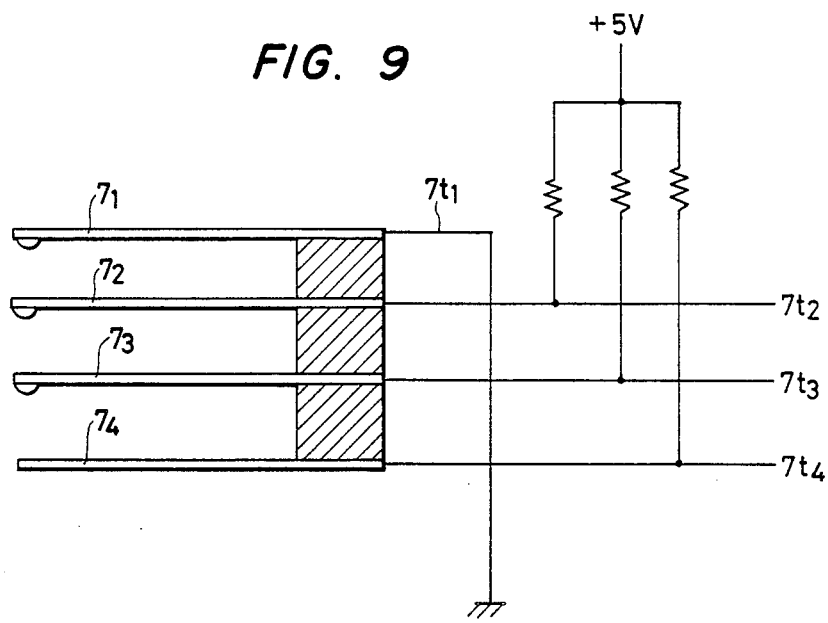
FIG. 9 is a circuit diagram showing an example of a structure of plate spring contacts.

The configuration and detection of closure of the plate spring contacts $7_x(7_{x+}, 7_{x-})$ and $7_y(7_{y+}, 7_{y-})$ will now be described with reference to FIG. 9.

The CPU 9 periodically examines terminals $7_{t1}$ to $7_{t4}$ of the plate spring contacts which are actuated upon depression of the cursor movement control key switch 5. When the cursor movement control key switch 5 is depressed and the plate spring contacts $7_1$ and $7_2$, for example, of a given plate contact $7_{x+}$, $7_{x-}$, $7_{y+}$ or $7_{y-}$ are closed, the terminal $7_{t2}$ is connected to the terminal $7_{t1}$ which is grounded. Thus, the terminal $7_{t2}$ produces a voltage of 0 V. When the plate spring contacts $7_2$ and $7_3$ are not closed, the output from the terminal $7_{t3}$ is +5 V as may be seen from the figure. Therefore, if the terminals $7_{t2}$ to $7_{t4}$ are examined, it may be easily seen which one of the contacts are closed. For example, when the cursor movement control key switch 5 is depressed strongly, the terminals $7_{t2}$, $7_{t3}$ and $7_{t4}$ of a given plate contact $7_{x+}$, $7_{x-}$, $7_{y+}$ or $7_{y-}$ sequentially produce outputs of 0 V. If the cursor movement control key switch 5 is not depressed, all the terminals $7_{t2}$ to $7_{t4}$ produce outputs of +5 V.

Figure 7:
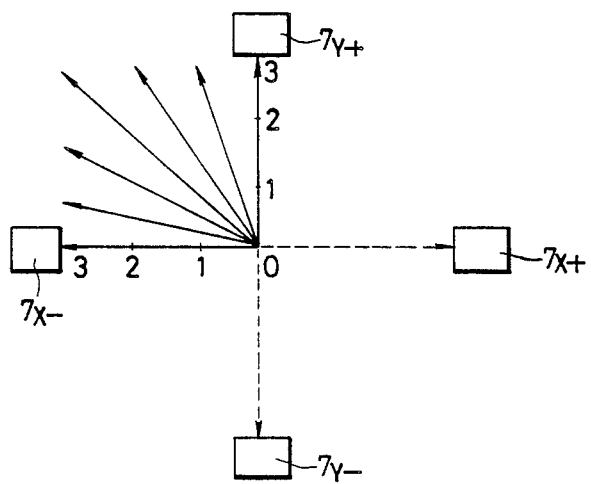
FIG. 7 is a graph showing the relationship between the operation of the contacts of the cursor movement control key switch and the direction of movement of the cursor.

The CPU 9 can thus detect the contact information of each plate spring contact by monitoring the outputs from the corresponding terminals $7_{t2}$ to $7_{t4}$. Then, based on the detected results, the CPU 9 can determine the direction and speed of movement of the cursor 4 to be made by referring to the information on the direction and speed of the movement of the cursor stored in the ROM 11. FIG. 7 shows the direction and speed of cursor movement determined by the CPU 9 in this manner. FIG. 7 shows a case wherein the cursor movement control key switch 5 is depressed in the directions of the plate spring contacts $7_{x-}$ and $7_{y+}$. However, if the cursor movement control key switch 5 is depressed in the directions of the plate spring contacts $7_{x+}$ and $7_{y+}$, cursor movement results in the direction of the resultant force according to the parallelogram law formed by the plate spring contacts $7_{x+}$ and $7_{y+}$ and a predetermined point as a target position of the cursor movement is determined.

In the first embodiment described above, the display portion 2 and the cursor movement control key switch 5 may be arranged separately of the main body 1. Furthermore, information on the closed/open state of the plate spring contacts may be produced in the form of an analog signal and the analog signal may be converted to a digital signal which may then be supplied to the CPU 9.

According to the first embodiment of the present invention described above, control input for moving the cursor on the display portion or screen may be entered through a single key top. Since the cursor may be moved with simplest operation while observing the display portion, and since the direction and speed of the movement of the cursor may be controlled with a single key, movement of the cursor may be performed easily and quickly.

A second embodiment of the present invention which has a different configuration to that of the first embodiment will now be described with reference to FIGS. 11(A) to 11(D). A cursor movement control key switch according to the second embodiment of the present invention has improved operability and freely allows horizontal or vertical movement of the cursor. The second embodiment will be described in more detail below.

The process of moving a cursor on a display portion 2 diagonally toward the top left or the bottom right by a cursor movement control key switch 105 of the second embodiment of the present invention, is shown in FIG. 3. The cursor movement control key switch 105 is simply depressed horizontally and diagonally to the top left (arrow A) or diagonally to the bottom right (arrow B) as shown in FIG. 10 (A), or vertically downward at point C at the top left or point D at the bottom right so as to move the cursor. If one wishes to move the cursor quickly, he need only to strongly depress the cursor movement control key switch 105 in the desired horizontal direction or vertically downward. As shown in FIGS. 11(A) to 11(D) and 12(A) to 12(B), in the cursor movement control key switch 105, spherical pressure balls 106 and plate spring contacts $107_{x+}$, $107_{x-}$, $107_{y+}$ and $107_{y-}$ are provided below a key top $105_1$. Each plate spring contact includes plate spring contacts $107_1$ to $107_4$ which are isolated by insulators 108. As the force acting on the key top $105_1$ increases, the plate spring contacts $107_1$ to $107_4$ of the corresponding plate spring contact $107_{x+}$, $107_{x-}$, $107_{y+}$ or $107_{y-}$ contact each other in the order named. Then, the information relating to the contact conditions of the plate spring contacts $107_1$ to $107_4$ is detected by the CPU 9 shown in FIG. 8(A). On the basis of the contact information, the CPU 9 determines the direction and speed of movement of the cursor 4 according to the flowchart shown in FIG. 8(B).

Figure 10A:
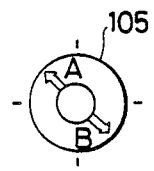
FIG. 10(A) and 10(B) are representations for explaining the mode of operation of a cursor movement control key switch according to the second embodiment of the present invention.
Figure 10B:
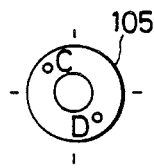
Figure 12A:
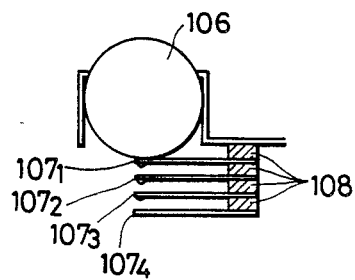
FIGS. 12(A) and 12(B) are partial detailed views of the plate spring contacts of the switch shown in FIGS. 11(A) to 11(D)
Figure 12B:
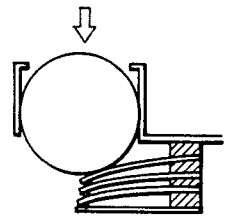

When a cursor movement control key switch 105 is moved or depressed in the direction corresponding to none of the plate spring contacts $107_{x+}$, $107_{x-}$, $107_{y+}$ and $107_{y-}$, e.g., in the direction indicated by arrow A in FIG. 10(A), or when a point between the plate spring contacts $107_{x+}$, $107_{x-}$, $107_{y+}$ and $107_{y-}$, e.g., the point C is depressed downward as shown in FIG. 10(B), depressing force acts both on plate spring contacts $107_{x-}$ and $107_{y+}$. In this case, the components of force in the X- and Y-axis directions respectively act on the plate spring contacts $7_{x-}$ and $7_{y+}$ according to the parallelogram law, as has been described with reference to FIG. 7. Then, the CPU 9 detects the ratio of the components of force. The CPU 9 determines the direction of movement of the cursor 4 to be made on the basis of the ratio of the components of the force. The flow of the cursor control by the CPU 9 is shown in FIG. 8(B).

Each pressure ball 106 is housed in a guide 121 so as to move the corresponding plate spring contact in a closing direction 124 irrespective of horizontal or vertical movement of the key top $105_1$. A cam surface 122 is formed on the lower surface of the key top $105_1$ and supports the key top 105, by normally contacting with the pressure balls.

Figure 11A:
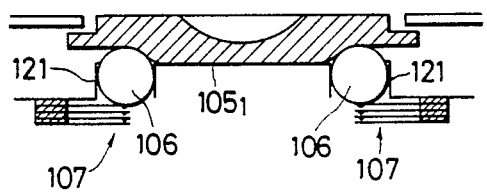
FIGS. 11(A) to 11(C) are sectional views.
Figure 11B:
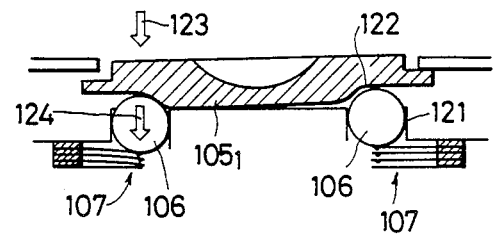
Figure 11C:
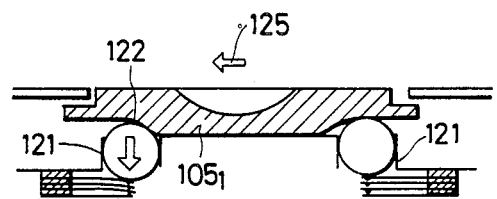
Figure 11D:
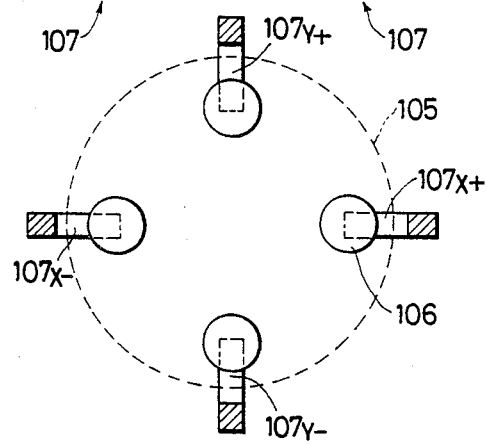
FIG. 11(D) is a plan view of the cursor movement control key switch shown in FIGS. 10(A) and 10(B)

The operation of the key of the second embodiment of the present invention will be described with reference to the drawings, in which FIG. 11(A) shows the initial state and FIG. 11(B) shows a state wherein the cursor movement control key switch is pressed from the top in the vertical direction (arrow 123), the pressure balls are pressed in a vertical direction (arrow 124), and the plate spring contacts are closed. When the finger of the operator leaves the cursor movement control key switch 105, the biasing force of the plate spring contacts urges the pressure balls 106 upward and return the key to its initial state. As shown in FIG. 11(C), when the key top $105_1$ is depressed in a horizontal direction (sliding direction) 125, the cam surface 122 rides over the pressure ball 106 to urge it downward in the vertical direction 124 and to close the corresponding plate spring contact. When the finger of the operator leaves the key top $105_1$, the cam surface 122 is pressed in the opposite direction to the arrow 125 by the biasing force of the plate spring contact so as to return the cursor movement control key switch 105 to its initial state shown in FIG. 11(A).

The configuration and detection of the closed/open states of plate spring contacts $107_x(107_{x+}, 107_{x-})$ and $107_y(107_{y+}, 107_{y-})$ are the same as those described with reference to FIG. 9.

In the second embodiment described above, the CPU 9 shown in FIG. 8(A) periodically examines the outputs from terminals of plate spring contacts which are actuated upon depression in the horizontal or vertical direction of the cursor movement control key switch 105.

In the second embodiment described above, the display portion 2 and the cursor movement control key switch 105 may be arranged separately of the main body 1. Commercially available semiconductor switches may be used in place of the pressure balls 106 and the plate spring contacts $107_{x+}$, $107_{x-}$, $107_{y+}$ and $107_{y-}$. Furthermore, information on the closed/open state of the plate spring contacts may be produced in the form of an analog signal and the analog signal ma be converted to a digital signal which may then be supplied to the CPU 9.

The second embodiment of the present invention may be applied to equipment for producing an output which designates the position on a two-dimensional display area. The present invention may therefore be applied to a pen of an X-Y plotter, a spot moving operation switch of a graphic display or the like in place of a cursor.

According to the second embodiment of the present invention described above, selection may be made between the horizontal and vertical directions. Even if a position is to be designated in the vertical direction, the operator may move the switch in the vertical direction which is easier for the operator. If a position is to be designated in the horizontal direction, the operation may switch in the horizontal direction instead of the vertical direction. As a result, the switch of the present invention allows skilled and quick operation. Furthermore, since the direction of movement of the switch may be switched between the horizontal and vertical directions, the operability is improved.

A cursor movement control key switch of a third embodiment of the present invention which has a different configuration to those of the first and second embodiments of the present invention as described above will now be described. The cursor movement control key switch of the third embodiment allows control input of movement of the cursor on a display portion by operation of a single key. High or low speed operation of the key may be selected by operation of the same, single key. The third embodiment of the present invention will be described in detail below.

A case will be described wherein a cursor 4 on a display portion 2 shown in FIG. 3 is moved to the top left according to the third embodiment. Referring to the plan view of a cursor movement control key switch 204 shown in FIG. 13, when the operator places his or her finger in the vicinity of the center (point B) of a key top 205 or when he or she slides it diagonally toward the top left (arrow A) with more than one finger, the cursor 4 starts moving toward the top left on the display portion 2. If it is desired to move the cursor 4 rapidly to a desired point, the center (point B) of the key top 205 may be depressed as the key top 205 is slid toward the top left. The speed of movement of the cursor 4 is increased accordingly. When the downward depressing force is released at a point near the desired point, the cursor 4 returns to the normal speed. When the cursor 4 reaches the desired point, the sliding force may then be released. Then, the cursor 4 stops at the desired point and cursor movement is terminated.

Figure 14A:
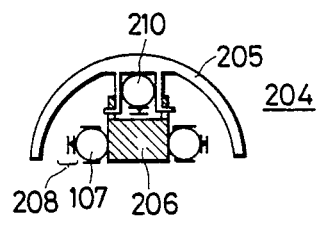
FIGS. 14(A) to 14(C) are sectional views and FIG. 14(D) is a plan of the switch shown in FIG. 13.
Figure 14B:
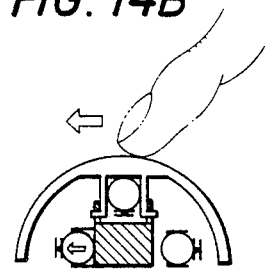
Figure 14C:
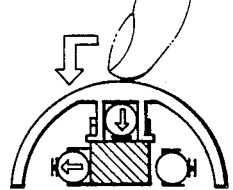
Figure 14D:
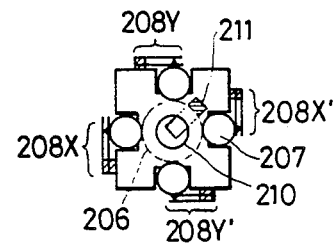
Figure 15A:
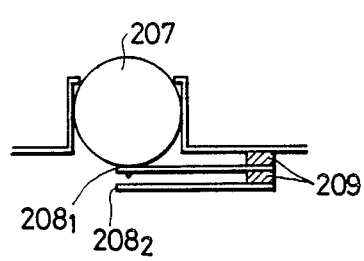
FIGS. 15(A), 15(B), 16(A) and 16(B) are partial detailed views of the plate spring contacts of the switch shown in FIGS. 14(A) to 14(D)
Figure 15B:
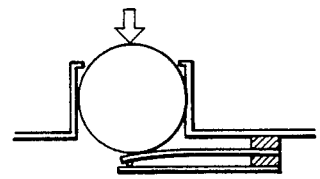
Figure 16A:
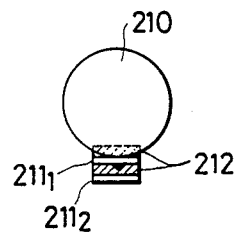
Figure 16B:
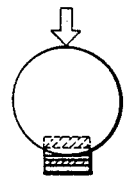

Movement of the cursor 4 by the operation of the key top 205 is closely related to the structure of the cursor movement control key switch 204 of the third embodiment to be described below. FIG. 14(A) is a sectional view showing the structure of the cursor movement control key switch 204. Referring to this figure, spherical pressure balls 207 and plate spring contacts $208_x$, $208_{x'}$, $208_y$ and $208_{y'}$ are arranged around a slide section 206. Each plate spring contact includes plate spring contacts $208_1$ and $208_2$ isolated by insulators 209 as shown in FIG. 15(A). When the horizontal force acts in the key top 205, slide sections 206 of the plate spring contacts $208_1$ and $208_2$ of a corresponding plate spring contact $208_x$, $208_{x'}$, $208_y$ or $208_{y'}$ move and contact as shown in FIG. 15(B). FIG. 14(D) is a plan view showing the arrangement of four plate spring contacts included in the cursor movement control key switch 204 and a single plate spring contact 211. On the X-Y coordinates, the plate spring contacts $208_x$ and $208_{x'}$ on the X-axis are related to the horizontal movement of the cursor on the X-axis. The plate spring contacts $208_y$ and $208_{y'}$ arranged on the Y-axis, are related to the vertical movement of the cursor on the display portion 2. When the key top 205 is slid in a given direction, one or two plate spring contacts contact, and contact information is read out by the CPU 9 described with reference to FIG. 8(A). Thus, the direction of movement of the cursor 4 is controlled. Similarly, a spherical pressure ball 210 and the plate spring contact 211 are arranged below the key top 205 which is vertically slidably mounted on the slide section 206. The plate spring contact 211 includes plate spring contacts $211_1$ and $211_2$ isolated from each other by insulators 212, as shown in FIG. 16(A). When the downward force acts on the key top 205, the plate spring contacts $211_1$ and $211_2$ contact each other as shown in FIG. 16(B). The plate spring contact 211 is arranged on the intersection (origin) of the X- and Y-axes so as to respond to pressing force acting along the Z-axis. When the key top 205 is depressed downward as it is slid in the manner as described above, the plate spring contact 211 closes. The contact information of the plate spring contact 211 is read out by the CPU 9 as shown in FIG. 8(A) and the speed of movement of the CPU 9 is increased. The flow of the operation of the CPU 9 as described above is performed according to the flowchart shown in FIG. 17.

Figure 13:
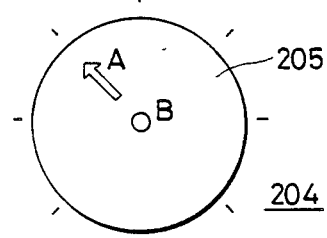
FIG. 13 is a representation for explaining the mode of operation of a cursor movement control key switch according to a third embodiment of the present invention.
Figure 18A:
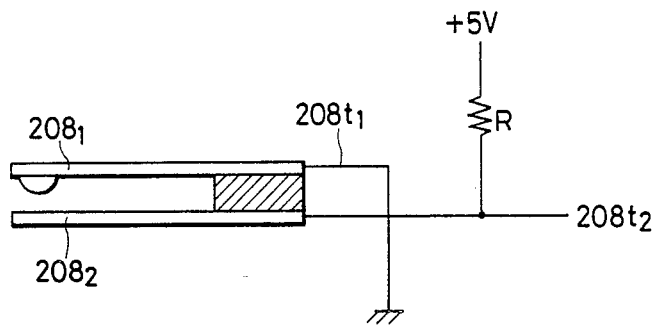
FIGS. 18(A) and 18(B) are circuit diagram showing an example of the structure of the plate spring contacts of the switch.
Figure 18B:
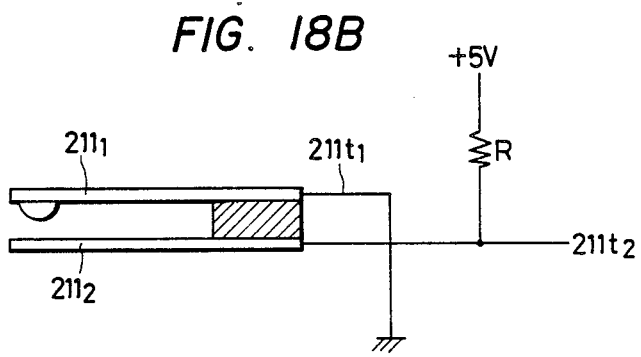

The mode of operation of the third embodiment will now be described with reference to FIG. 13. When the center (point B) of the key top 205 is depressed to slide the key top 205 in the direction indicated by arrow A, the sliding force acts on both the plate spring contacts $208_x$ and $208_y$ to contact them. The CPU 9 detects the contact information and determines the vertical upward direction and horizontal left direction of movement of the cursor 4 on the display portion 2 by referring to the direction information of movement of the cursor which is stored in the ROM 11. When the vertical downward force acting on the center of the key top 205 is increased (FIG. 14(C)), the plate spring contact 211 contacts. The CPU 9 detects this contact information and determines and controls the speed of movement of the cursor 4 on the display portion 2. When the finger is released from the key top 205 in this condition, the key top 205 returns to the initial state by its biasing force. The respective contacts are then released, and movement of the cursor 4 is terminated. The means for releasing and closing the plate spring contacts $208_x$, $208_{x'}$, $208_y$, $208_{y'}$, and 211 will now be described with reference to FIG. 18.

The CPU 9 which controls the movement of the cursor 4 periodically examines terminals $208_{t2}$ of the plate spring contacts $208_x$, $208_{x'}$, $208_y$ and $208_{y'}$. When the cursor movement control key switch 204 is depressed horizontally, and the plate spring contacts $208_1$ and $208_2$ of a corresponding plate spring contact $208_x$, $208_{x'}$, $208_y$ or $208_{y'}$ are closed, the terminal $208_{t2}$ of the plate spring contact $208_2$ produces an output of 0 V since it is connected to a terminal $208_{t1}$ of the plate spring contact $208_1$ which is grounded. When the terminal $208_{t2}$ is not closed, it normally produces an output of +5 V by means of a resistor R. The closed/open state of the contact may be determined by examining the outputs from the terminals $208_{t2}$. The direction of movement of the cursor 4 which must be made may be sensed by monitoring the outputs from the four terminals $208_{t2}$. Whether to move the cursor 4 rapidly or slowly may be determined by monitoring the output from the terminal $211_2$.

In the third embodiment described above, the display portion 2 and the cursor movement control key switch 204 may be arranged separately of the main body 1. Commercially available switches may be used in place of the pressure balls 207 and 210 and the plate spring contacts $208_x$, $208_{x'}$, $208_y$, $208_{y'}$ and 211. Although the speed of movement of the cursor is made rapid in the third embodiment, it may be slowed down if so desired. Then, positioning of the cursor on the display portion may be made precisely.

According to the third embodiment described above, a single key top can be used to supply a control signal for controlling the movement of the cursor on the display portion. High and low speed movement of the cursor may be selected with the single key. Therefore, an unskilled operator may be able to move the cursor to a desired position on the display portion while viewing it, resulting in efficient and fast operation. The operability of the switch of the present invention is an improvement over a conventional switch which involves a set of four keys. Information on the vertical movement of the key top operated by the finger may be used to select the speed of movement of the cursor on the display portion. In this manner, the switch of the third embodiment has a simple structure and yet provides an excellent operability.

A fourth embodiment of the present invention using a cursor movement control key switch of the embodiments as described above will now be described. A cursor movement control key switch according to the fourth embodiment of the present invention allows control of the movement of the cursor by operation of a single key. Furthermore, depression of a desired point of the same key can designate a given function. The fourth embodiment of the present invention will be described in more detail below.

A case will be described in which a cursor 4 on a display portion 2 shown in FIG. 3 is moved to the top left (home position) in FIG. 3 according to the fourth embodiment.

Figure 19:
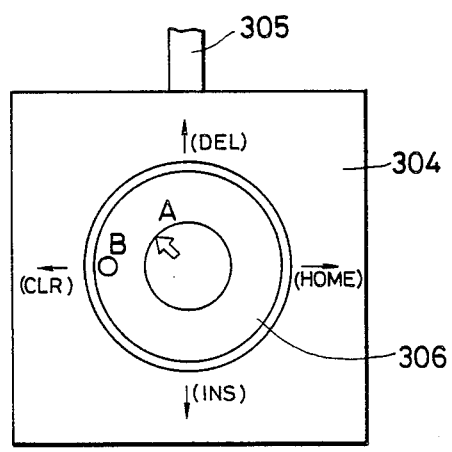
FIG. 19 is a view for explaining the mode of operation of a cursor movement control key switch according to a fourth embodiment of the present invention.

FIG. 19 is a plan view showing the details of a cursor movement control key switch 304 according to the fourth embodiment. When a key top 306 is slid in the direction indicated by arrow A, the cursor is moved in the direction indicated in FIG. 2. The cursor may be moved to the home position by combining the slide operations in the vertical and horizontal directions as needed.

In the fourth embodiment, the cursor movement control key switch 304 and a personal computer main body are connected through a cable 305.

According to another example of operation, when point B marked with a hollow circle is depressed vertically downward, the key will then have the same function as the conventional home clear key. Then, the cursor 4 moves to the home position, and the information on the screen is cleared.

The above operation is performed in the following manner. The key top 306 is displaced, and a displacement detecting means produces a corresponding electrical signal which is read by the CPU 9 as described with reference to FIG. 8(A). This signal is then used as a command signal to execute a function as described above. The control flow of the CPU 9 upon detection of displacement of the key top 306 will now be described with reference to the sectional view of the key switch shown in FIGS. 20(A) to 20(F) and to the flowchart shown in FIG. 21.

Figure 20A:
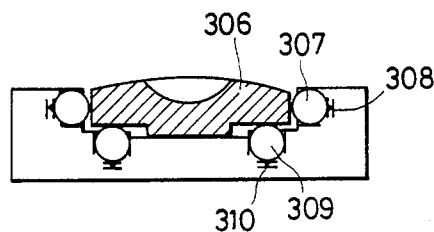
FIGS. 20(A) to 20(C) are sectional and FIG. 20(D) is a plan view of the switch shown in FIG. 19, and FIGS. 20(E) and 20(F) show the structure of the plate spring contacts of the same.
Figure 20B:
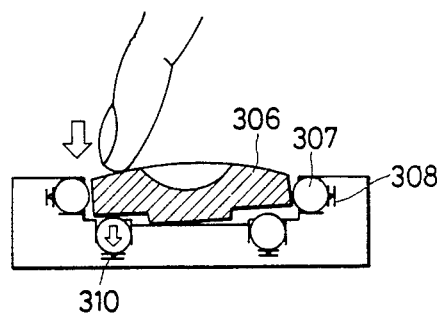
Figure 20C:
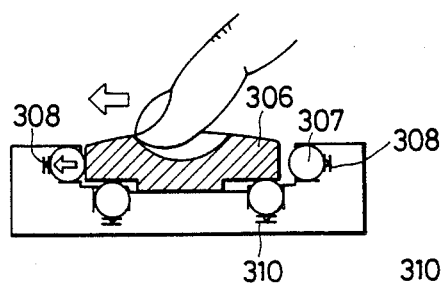
Figure 21:
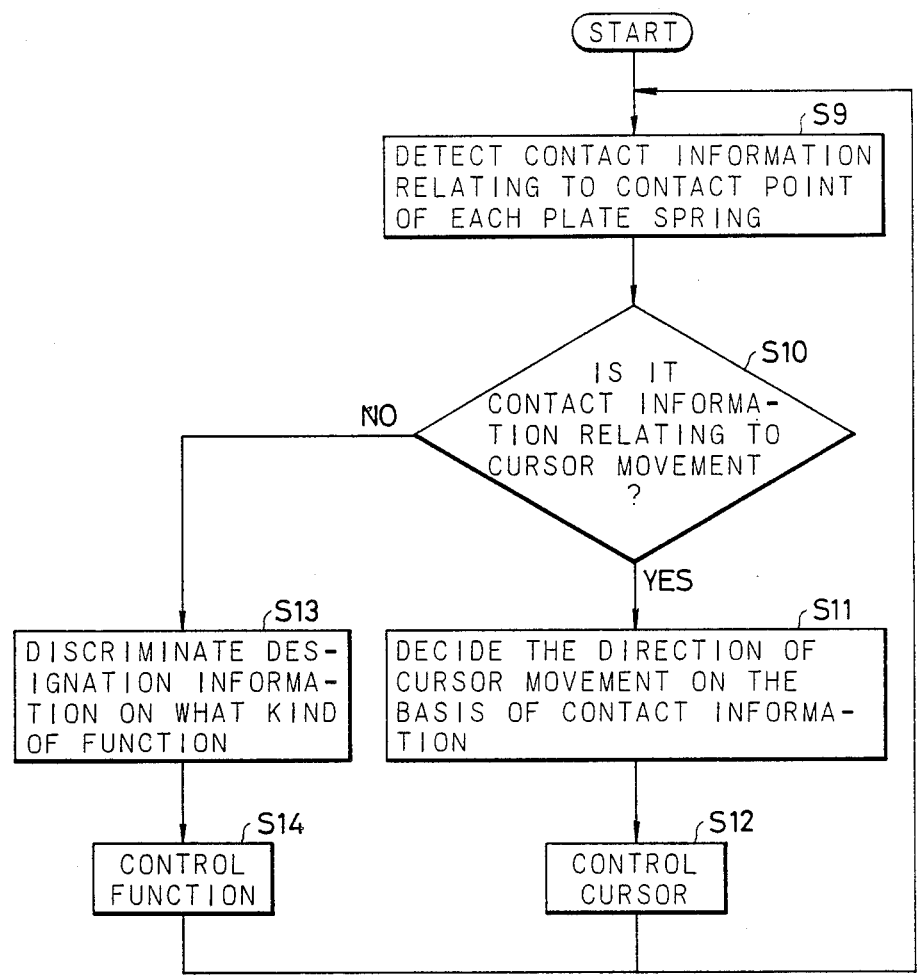
FIG. 21 shows a control flowchart of the switch shown in FIGS. 20(A) to 20(E)

FIGS. 20(A) to 20(C) are sectional views showing the structure of the cursor movement control key switch according to the fourth embodiment of the present invention.

Figure 20D:
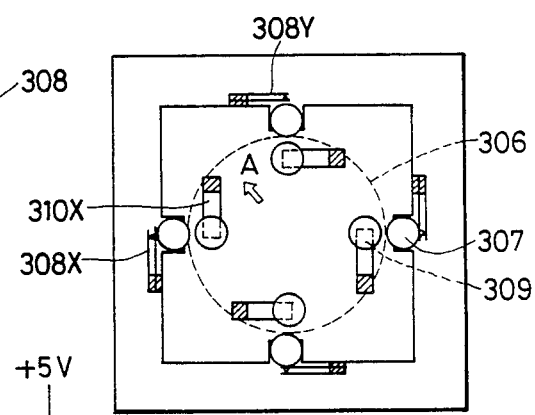

Referring to FIG. 20(A), spherical pressure balls 307 and plate spring contacts 308 ($308_x$, $308_y$ and so on) are disposed around the key top 306. When the sliding force acts on the key top 306, the corresponding plate spring contact closes as shown in FIG. 20(C). The contact information is then read by the CPU 9, and is detected to be the contact information for cursor movement control. A movement signal for the cursor 4 is then generated. In this case, the CPU 9 decides the direction of movement of the cursor by referring to the cursor movement information stored in the ROM 11. FIG. 20(D) is a plan view of the switch. When the key top 306 is slid in the direction corresponding to no one of the plate spring contacts, that is, in the direction indicated by arrow A, the force acts on both plate spring contacts $308_x$ and $308_y$ which simultaneously close. The contact information is read by the CPU 9, and the cursor 4 is moved diagonally toward the top left in accordance with the detected cursor movement information.

Spherical pressure balls 309 and plate spring contacts 310 ($310_x$, $310_y$ and so on) are disposed below the key top 306. When the vertical downward force acts on the key top 306, the corresponding plate spring contact 310 closes as shown in FIG. 20(B). The contact information is read by the CPU 9 (shown in FIG. 8) and is detected as a function designation signal. The CPU 9 decides what function is designated on the basis of the function designation signal. When the point B (CLR) of the key top 306 shown in FIG. 19 is depressed vertically downward, the CPU 9 uses a corresponding detection output to designate the home clear function. In FIG. 19, (INS) designates insertion, (HOME) designates the return of the cursor to the home position, and (DEL) designates the depression position for deletion.

The means for detecting release and closure of the plate spring contacts 308 will now be described with reference to FIGS. 20(E) and 20(F).

Each plate spring contact includes plate spring contacts $308_1$ and $308_2$ which are isolated by an insulator 315. When the sliding force acts on the key top 306, the plate spring contacts $308_1$ and $308_2$ of a corresponding plate spring contact $308_x$ or the like close as shown in FIG. 20(C). Therefore, a terminal $308_{t2}$ of the plate spring contact $308_2$ is connected to a grounded terminal $308_{t1}$ of the plate spring contact $308_1$ and produces an output of 0 V. If the terminal $308_{t2}$ is not closed, it produces an output of +5 V by means of a pull-up resistor R.

Figure 20E:
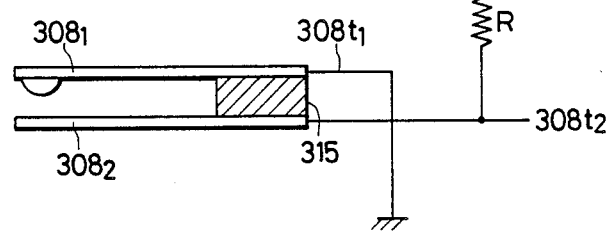
Figure 20F:
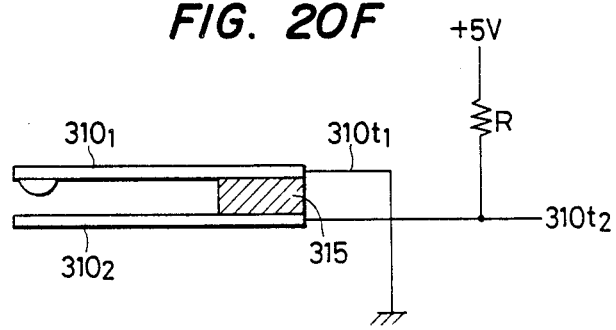

Each plate spring contact 310 includes plate spring contacts $310_1$ and $310_2$ separated by an insulator 315, as shown in FIG. 20(F). When the depressing force acts on the key top 306, the plate spring contacts $310_1$ and $310_2$ are closed as shown in FIG. 20(C). Since a terminal $310_{t2}$ is connected to a grounded terminal $310_{t1}$, it produces an output of 0 V. When the plate spring contacts $310_1$ and $310_2$ are not closed, the terminal $310_{t2}$ produces an output of +5 V by means of a pull-up resistor R.

The CPU 9 periodically examines the terminals of the plate spring contacts 308 and 310. If at least one contact is closed, the main flow of the CPU 9 is interrupted. Then, the service for the cursor movement control key switch is initiated. When all the contacts are released, the service for the cursor movement control key switch is terminated. In any case, the contact information of the contacts is fetched to the CPU 9 periodically. Therefore, various pieces of information may be entered with the single key top by monitoring the terminals of the contacts.

In the fourth embodiment described above, the functions to be designated may be other than the (DEL), (INS), (HOME), and (CLR) functions. Furthermore, commercially available switches may be used in place of the pressure balls 307 and 309, and the plate spring contacts 308 and 310.

According to the fourth embodiment described above, eight types of first binary electrical signals may be obtained by vertically shifting the key top 306 upward and downward. Similarly, eight types of second binary electrical signals may be obtained by horizontal sliding movement of the key top. Therefore, due to the symmetry of the switch structure, the first binary electrical signals may be used for cursor movement control signals, and the second binary electrical signals may be used as function designation signals.

In summary, according to the fourth embodiment of the present invention, natural movement of the finger of an operator to move a single key allows generation of electrical signals representing more information. By assigning a particular function to each electric signal, the functions which have been conventionally assigned to individual keys may be concentrated in one key. Then, selective operation of the single key may effect fast and reliable control of the cursor movement and designation of the function.

One of the first and second binary electrical signals may be used for cursor movement control and the other may be used for designation of the function, so that operability at the image information processor may be improved. Thus, a cursor movement control key switch of a simple structure can provide excellent operability.

A fifth embodiment of the present invention will now be described with reference to FIGS. 22 to 23(D). A cursor movement control key switch according to the fifth embodiment of the present invention allows execution of various functions together with cursor movement control by switching a single key. The fifth embodiment will be described in more detail below.

A case will now be described in which a cursor 4 on a display portion 2 is moved diagonally toward the top left according to the fifth embodiment. The cursor 4 may be moved by simply depressing a key top 406 of a cursor movement control key switch 404 diagonally to the top left (arrow A). If it is desired that a clear key be used as a function key, the key top 406 may be depressed to the left (arrow B) while depressing downward an "F" key 407 arranged independently. Upon this operation, the image on the display screen is cleared and the cursor 4 is moved to the top left (clear home function). In this embodiment, the cursor movement control key switch 404 is connected to the personal computer main body through a cable 405.

Figure 23A:
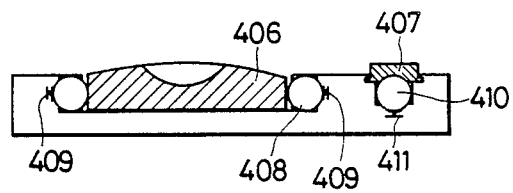
FIGS. 23(A) to 23(C) are sectional views and FIG. 23(D) is a plan view of the switch shown in FIG. 22.
Figure 23B:
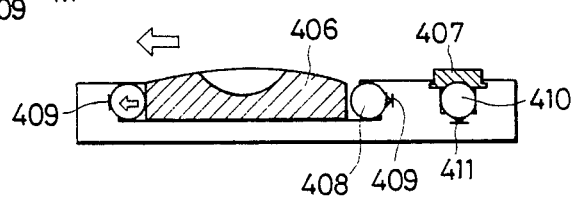
Figure 23C:
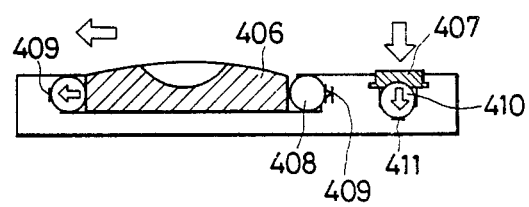
Figure 23D:
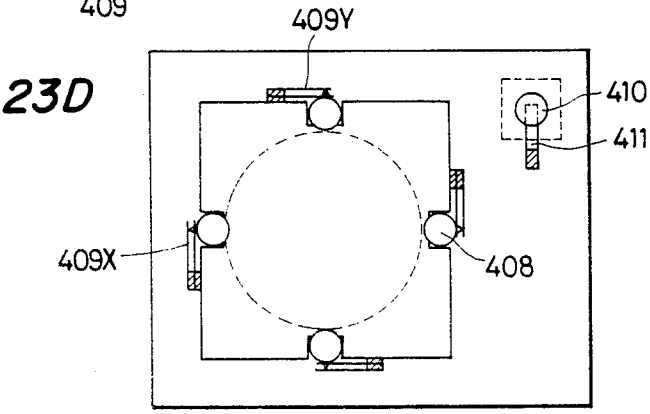
Figure 24:
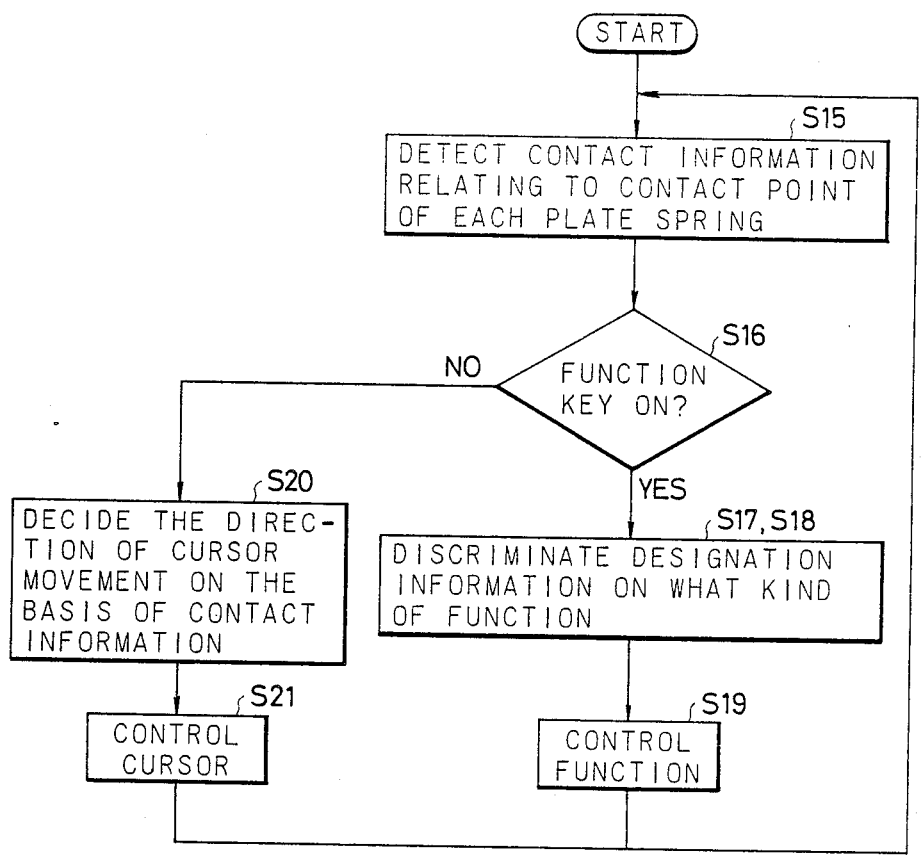
FIG. 24 shows a control flowchart of the switch shown in FIGS 23(A) to 23(D)

The structure of the cursor movement control key switch 404 will now be described. As shown in FIGS. 23(A) to 23(D), spherical pressure balls 408 and plate spring contacts 409 ($409_x$, $409_y$ and so on) are disposed around the key top 406. When the horizontal force acts on the key top 406, a corresponding plate spring contact closes. Control based on this contact information will be described with reference to FIG. 8(A). The contact information is detected by the CPU 9, and the detected contact information is processed in accordance with the flowchart shown in FIG. 24. In this case, when the detected contact information includes contact information corresponding to depression of the "F" key, the direction of movement of the cursor 4 is controlled. When the key top 406 is moved to a direction corresponding to no one of the plate spring contacts 409 as in the direction indicated by arrow A in FIG. 22, the force acts both on plate spring contacts $409_x$ and $409_y$ and these close. The contact information is detected by the CPU 9 and the direction of movement of the cursor 4 is decided based on the detected contact information. The cursor 4 is then moved diagonally toward the top left. A spherical pressure ball 410 and a plate spring contact 411 are also disposed below the "F" key 407. When the downward force acts on the "F" key, the plate spring key 411 contacts. Then, the contact information is detected by the CPU 9 as a shift signal. As a result, the contact information corresponding to the plate spring contact 409 may be switched as contact information on the function key. When the key top 406 is depressed in the direction indicated by arrow B in FIG. 20 as the "F" key 407 is depressed vertically downward, the plate spring contact 411 first closes. Then, the plate spring contact $409_x$ closes. The operation is thus performed in a similar manner to that in the case of depression of a conventional "CLR" key.

In the fifth embodiment described above, the functions are not limited to the "DEL", "INS", "HOME" and "CLR" functions. Commericially available switches may be used in place of the pressure balls 408 and 410 and the plate spring contacts 409 and 411. A lock function for the "F" key may also be incorporated.

The means for detecting release and closure of the plate spring contacts 409 and 411 is similar to that shown in FIGS. 20(E) and 20(F).

In the fifth embodiment described above, the "F" key is arranged outside the key top 406. However, the cursor movement control key switch may have the structure as shown in FIGS. 14(A) to 14(D) wherein an "F" key is arranged in correspondence with a plate spring contact 211 within the key top.

According to the present invention described above, complex operation of movement control of a cursor may be performed fast with a single key switch which provides a large amount of electrical information on the basis of natural movement of the finger of an operator. By using a shift signal in combination with the electrical information thus obtained, various functions may be executed in parallel with the movement control of the cursor. The operation involving the cursor movement control key switch may be performed within a short period of time and very efficiently.

Since the switch of the present invention has a means for generating a shift signal, an output signal for executing a large number of functions may be obtained by operation of the single key. In addition to this, if a give number of functions are required, keys numbering half that of the functions need only be used. Thus, the structure and operation of the key may be simplified. A cursor movement control key switch of the present invention has a simple structure and yet provides excellent operability.

A sixth embodiment of the present invention will now be described with reference to FIGS. 25, 26(A), 26(B), and 27(A) to 27(E). A cursor movement control key switch according to the sixth embodiment allows movement control of a cursor and a change in the cursor display size. The sixth embodiment of the present invention will be described in detail below.

Figure 25:
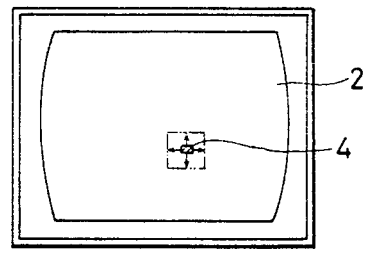
FIGS. 25, 26(A) and 26(B) are views for explaining the mode of operation of a cursor movement control key switch according to a sixth embodiment of the present invention.
Figure 26A:
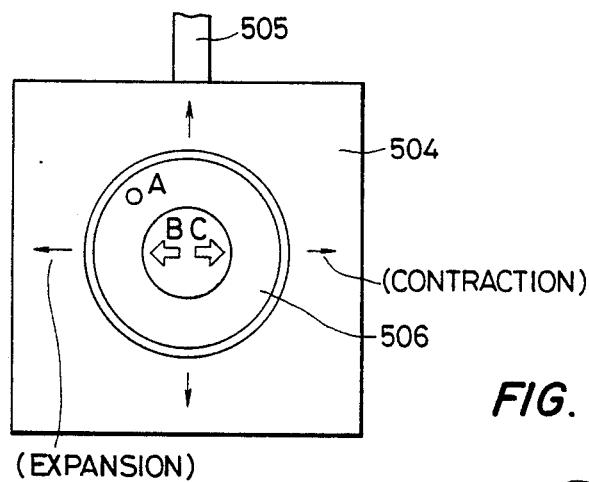
Figure 26B:
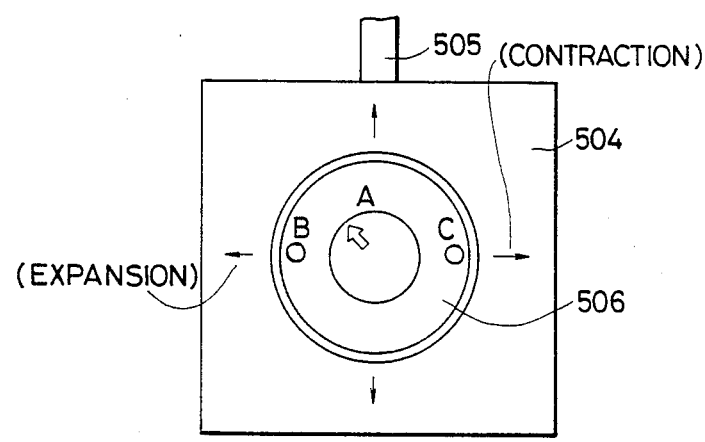

A case will be described in which a cursor 4 on a display portion 2 is moved diagonally toward the top left according to the sixth embodiment. In FIG. 26(A), the cursor 4 may be moved by depressing vertically downward point A on a key top 506. If a change in the cursor display size is desired, the cursor display size is increased when the key top 506 is slid in the direction indicated by arrow B. When the finger is released from the key top 506 at the desired size, the key top 506 returns to the initial position and a cursor of a desired size may be obtained. If it is desired to decrease the display size of the cursor 4, the key top 506 is slid in the direction indicated by arrow C. The mode of operation for changing the cursor display size on the display portion is shown in FIG. 25.

When the key top is operated in the manner described above, the key top 506 is displaced in position. The displacement detecting means detects such a displacement of the key top 506 and produces a corresponding electrical signal. The electrical signal is read by the CPU 9 shown in FIG. 8(A) and is used as a command signal for executing the desired function. The means for detecting the displacement of the key top 506 upon depression thereof will now be described. Note that the cursor movement control key switch 504 and a personal computer main body are connected through a cable 505.

Figure 27A:
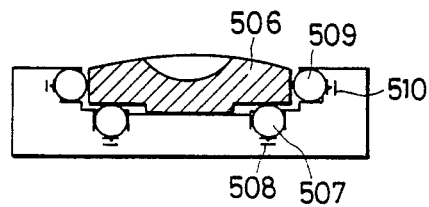
FIGS. 27(A) to 27(C) are sectional views and FIGS. 27(D) and 27(E) are plan views of the switch shown in FIGS. 25, 26(A) and 26(B)
Figure 27B:
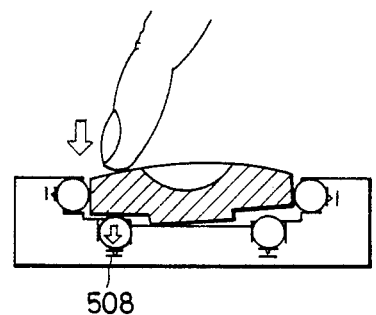

The structure of the cursor movement control key switch 504 will be described. As shown in FIGS. 27(A) to 27(E), spherical pressure balls 507 and plate spring contacts 508 ($508_x$, $508_y$, and so on) are disposed below the key top 506. When the downward force acts on the key top 506, the plate spring contact 508 closes as shown in FIG. 27(B). The contact information is detected by the CPU 9 as may be seen from FIG. 8(A) and the flowchart shown in FIG. 28. The contact information thus detected is discriminated as the contact information for movement control of the cursor, and the direction of the cursor movement to be made is decided on the basis of such contact information. Thus, the direction of movement of the cursor 4 is controlled. If the key top 506 is depressed vertically downward at a point corresponding to no one of the plate spring contacts 508, such as point A, the force acts on both plate spring contacts $508_x$ and $508_y$. When the plate spring contacts $508_x$ and $508_y$ thus close, the contact information is detected by the CPU 9, and similar control to that described above is performed to decide the direction of cursor movement to be made. The cursor 4 may then be moved diagonally toward the top left of the display portion 2.

Figure 27C:
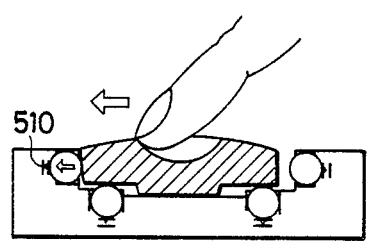
Figure 27D:
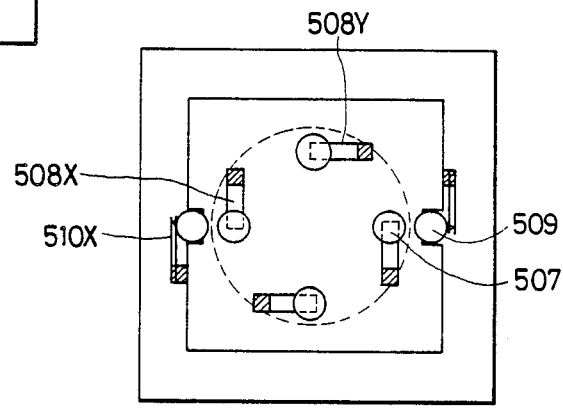
Figure 27E:
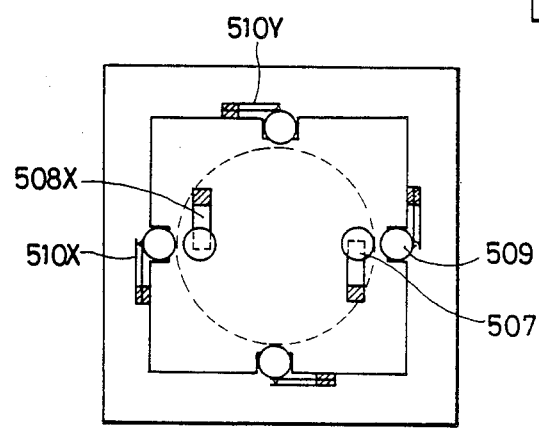
Figure 28:
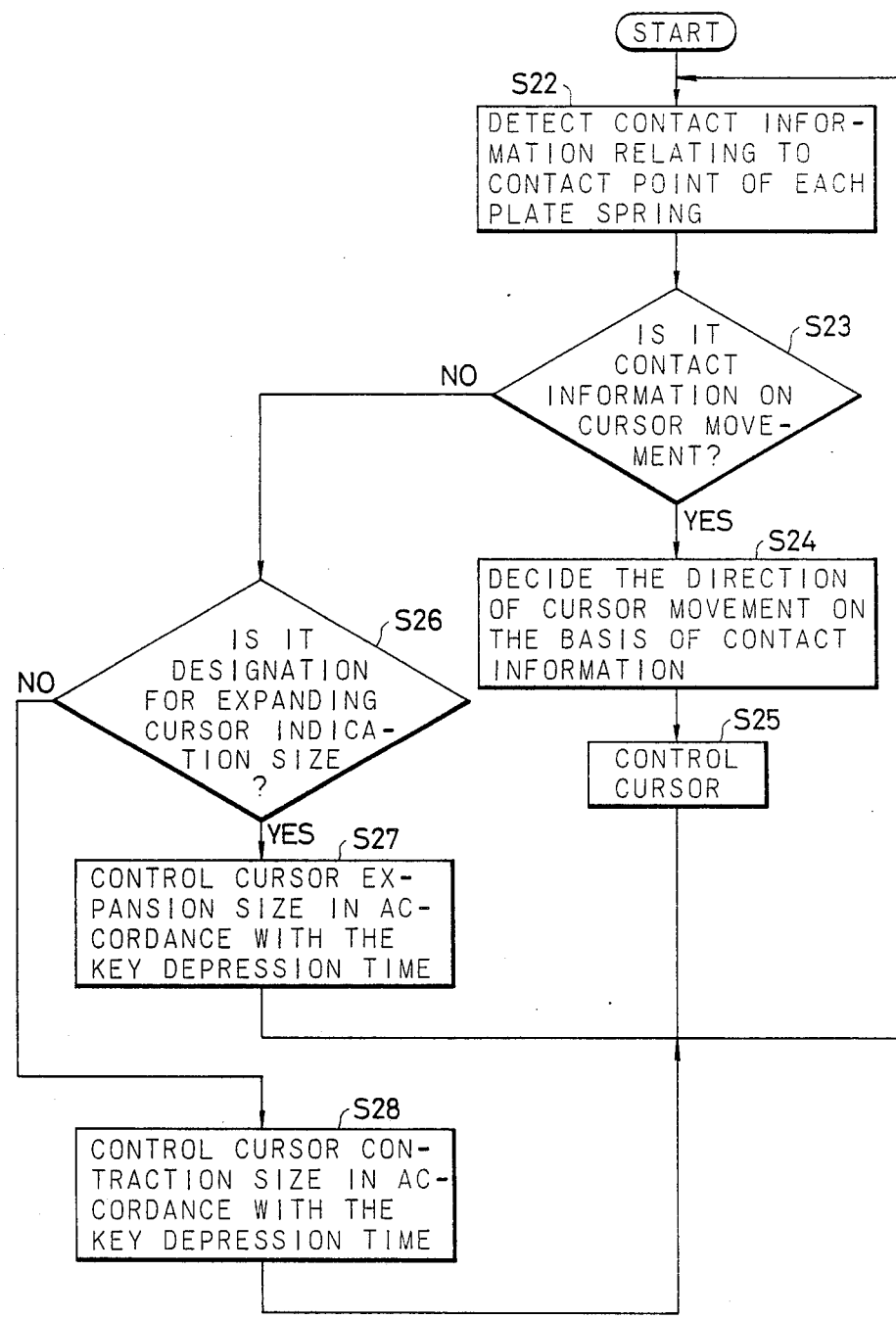
FIG. 28 shows a control flowchart of the switch shown in FIGS. 27(A) to 27(E)

Similarly, spherical pressure balls 509 and plate spring contacts 510 ($510_x$, $510_y$ and so on) are disposed around the key top 506. When the horizontal force acts on the key top 506, the corresponding plate spring contact $510_x$ or the like closes as shown in FIG. 27(C). The contact information thus obtained is detected by the CPU 9. The CPU 9 discriminates that the contact information is information for changing the cursor display size. Then, the size of the displayed cursor 4 is controlled. When the key top 506 is depressed in the direction indicated by arrow B in FIG. 26, for example, the force acts on the plate spring contact $510_x$ to allow it to contact. Then, the corresponding contact information is discriminated as the information for changing the cursor display size, and the desired mode of change is discriminated to be the increasing mode. Thus, the display size of the cursor 4 is increased. In this case, the display size of the cursor 4 is determined in accordance with the length of contact time of the plate spring contact, that is, the depression time of the key top. In order to make the display size of the cursor smaller, the key top 506 may be depressed in the direction indicated by arrow C. Then, similar operation to that described above is performed to decrease the display size of the cursor 4.

The means for detecting the release and closure of the plate spring contacts 508 and 510 is similar to that described with reference to FIGS. 20(E) and 20(F).

The CPU 9 periodically examines the terminals of the plate spring contacts 508 and 510. The direction of movement of the cursor 4 to be made may be detected by monitoring the outputs from the plate spring contacts 508. Similarly, information for controlling the cursor display size may be detected by monitoring the outputs from the terminals of the plate spring contacts 510. If the contact information which is obtained periodically in this manner is the same, the CPU 9 repeats the same control operation.

In the sixth embodiment as described above, first electrical signals obtained in response to vertical downward depression of the key top 506 are used for cursor movement control, while second electrical signals obtained in response to horizontal sliding movement of the key top 506 are used for cursor display size control. However, the first electrical signals may be used for cursor display size control, while the second electrical signals may be used for cursor movement control.

In the sixth embodiment as described above, commercial switches may be used in place of the spherical balls 507 and 509 and the plate spring contacts 508 and 510.

According to the sixth embodiment of the present invention, movement control of the cursor as well as a change in the cursor display size may be effected by operation of a key switch having a single key top. Therefore, the cursor may be moved easily and within a short period of time.

Especially in the case of a graphic display, the cursor display size may be freely changed for designating characters or numerals of different sizes displayed on a graph or for pointing to a specific point on the screen. Cursor control may be performed with excellent operability.

A seventh embodiment of the present invention will now be described with reference to FIGS. 29(A), 29(B), 31(A) to 31(E), 30 and 32. A cursor movement control key switch according to the seventh embodiment can allow cursor movement control as well as brightness control of the screen by operation of a single key. The seventh embodiment of the present invention will be described in detail below.

Figure 29A:
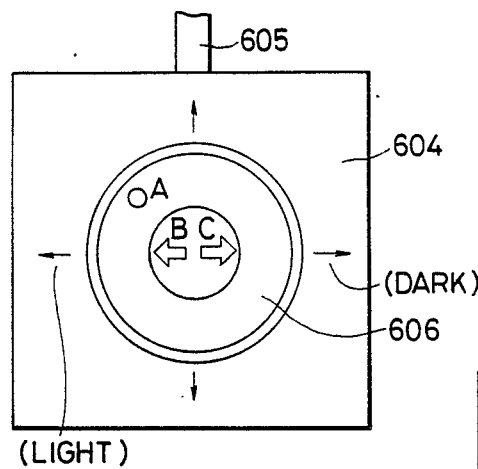
FIGS. 29(A) and 29(B) are views showing the mode of operation of a cursor movement control key switch according to a seventh embodiment of the present invention.

A case will be described in which a cursor 4 on a display portion 2 is moved diagonally toward the top left according to the seventh embodiment. In FIG. 29(A), the cursor 4 may be moved by depressing vertically downward point A at the top left on a key top 606 of a key switch 604. If it is desired to increase the brightness of the display portion 2, the key top 606 may be kept depressed to the left (arrow B) until the brightness on the screen is optimal. On the other hand, if it is desired to decrease the brightness, the key top 606 may be depressed to the right (arrow C) until the desired brightness is obtained. It is noted that the cursor movement control key switch 604 and a personal computer main body are connected through a cable 605 in the seventh embodiment.

Figure 30:
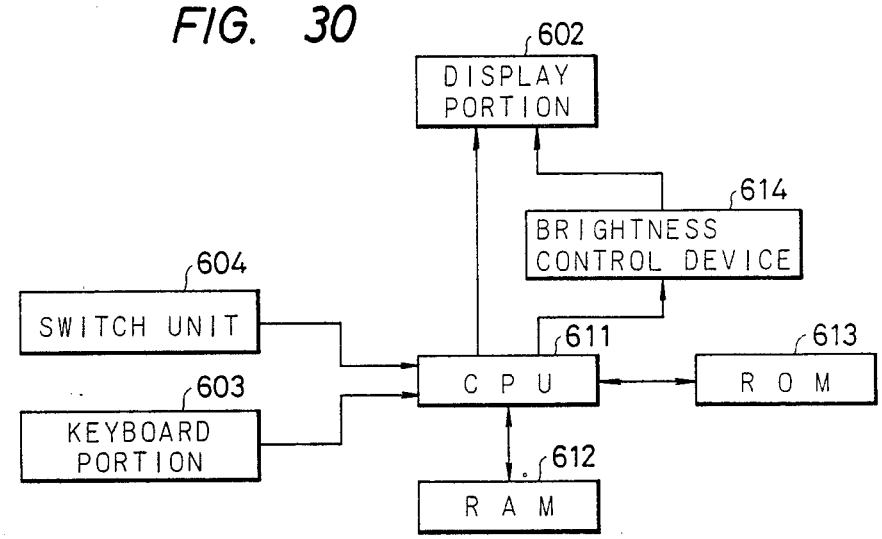
FIG. 30 is a block diagram showing the configuration of a personal computer adopting the switch shown in FIGS. 29(A) and 29(B)

The configuration of the personal computer having the cursor movement control key switch according to the seventh embodiment may be described as follows. As shown in FIG. 30, the personal computer includes a CPU 611 for main control, a ROM 613 storing a program, a RAM 612 to be used by the CPU 611, and a brightness control device 614 for changing the brightness on a display portion 602. A keyboard portion 603 and a switch unit or a cursor movement control key switch 604 according to the seventh embodiment are connected to the CPU 611.

Figure 31A:
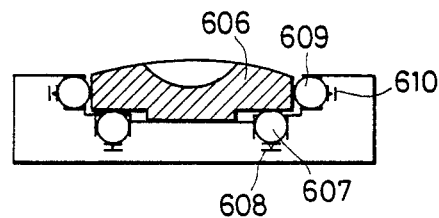
FIGS. 31(A) to 31(C) are sectional views.
Figure 31B:
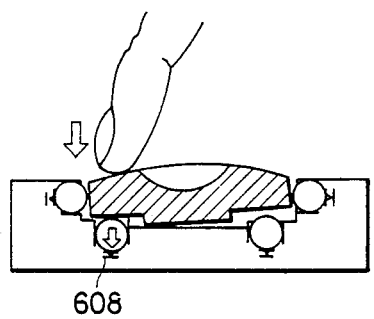
Figure 31C:
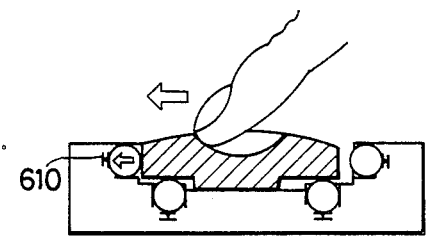
Figure 31D:
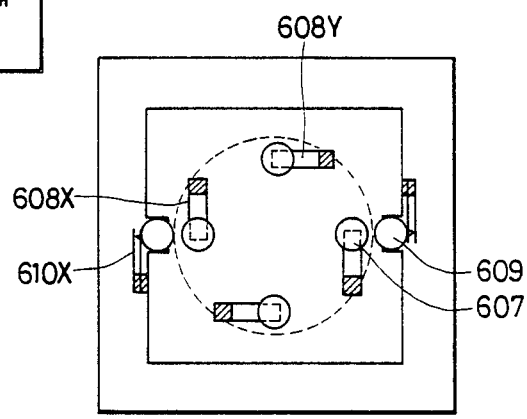
FIGS. 31(D) and 31(E) are plan views of the switch shown in FIG. 29.

The structure of the cursor movement control key switch 604 will be described. As shown in FIG. 31(A), spherical pressure balls 607 and plate spring contacts 608 ($608_x$, $608_y$ and so on) are disposed below the key top 606. When the downward force acts on the key top 606, the corresponding plate spring contact 608 is actuated. The contact information is detected by the CPU 611 as may be seen from FIG. 32 and the flowchart shown in FIG. 28. The contact information thus detected is discriminated as the contact information for movement control of the cursor, and the direction of the cursor movement to be made is decided on the basis of such contact information. Thus, the direction of movement of the cursor 4 is controlled. If the key top 606 is depressed vertically downward at a point corresponding to no one of the plate spring contacts 608, such as point A, the force acts on both plate spring contacts $608_x$ and $608_y$ as shown in FIG. 31(D). When the plate spring contacts $608_x$ and $608_y$ thus close, the contact information is detected by the CPU 611, and similar control such as that described above is performed to decide the direction of cursor movement to be made. The cursor 4 may then be moved diagonally toward the top left of the display portion 2.

Similarly, spherical pressure balls 609 and plate spring contacts 610 ($610_x$ and $610_y$) are disposed around the key top 606. When the horizontal force acts on the key top 606, the corresponding plate spring contact 610 is actuated. The contact information thus obtained is detected by the CPU 611. The CPU 611 discriminates that the contact information is information for changing the brightness. The brightness of the display portion 602 is controlled through the brightness control device 614. The brightness control device 614 can adjust the beam current of the display portion 602 in accordance with the signal supplied from the CPU 611. When the key top 606 is depressed in the direction indicated by arrow B in FIG. 29(A), for example, the force acts on a plate spring contact $610_x$ shown in FIG. 31(D) to allow its contact. The corresponding information is discriminated to be information for changing the brightness in the increasing mode. Then, the CPU 611 controls the brightness control device 614 so as to increase the brightness of the display portion 602.

The brightness of the display portion 602 is decided in accordance with the contact time of the plate spring contact, that is, the depression time of the key top. In order to decrease the brightness, the key top 606 may be depressed in the direction indicated by arrow C in FIG. 29A to perform similar control.

The means for detecting release and closure of the plate spring contacts 608 and 610 is similar to that described with reference to FIGS. 20(E) and 20(F).

The CPU 611 examines the terminals of the plate spring contacts 608 and 610.

The direction of movement of the cursor 4 to be made may be detected by monitoring the terminals of the four plate spring contacts 608, while the increase/decrease in the brightness of the display portion 602 may be detected by monitoring the terminals of the two plate spring contacts 610. If the contact information obtained periodically in this manner is the same, the CPU 611 repeats the same control operation.

Figure 29B:
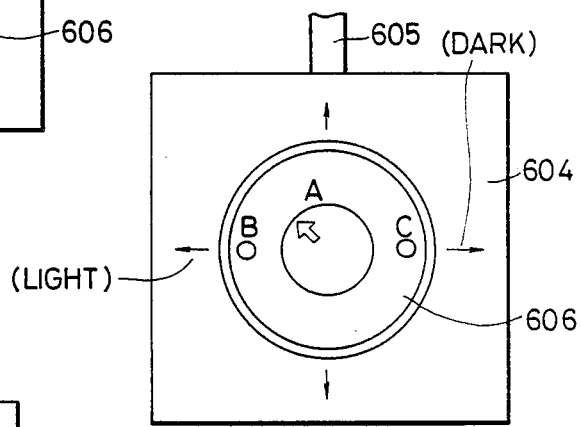

The structure of the key switch of the seventh embodiment of the present invention has symmetry. Therefore, an output signal for cursor movement control is generated in response to a horizontal sliding displacement of the key top 606, while an output signal for brightness control is generated in response to selective downward depression displacement of the key top 606. The cursor 4 may be moved by simply depressing the key top 606 of the cursor movement key switch 604 diagonally toward the top left (arrow A), as shown in FIG. 29(B).

If it is desired to increase the brightness, the left portion (point B) of the key top 606 is depressed downward until a desired brightness is achieved. In order to decrease the brightness, the right portion (point C) of the key to 606 is depressed downward until a desired brightness is achieved.

Figure 31E:
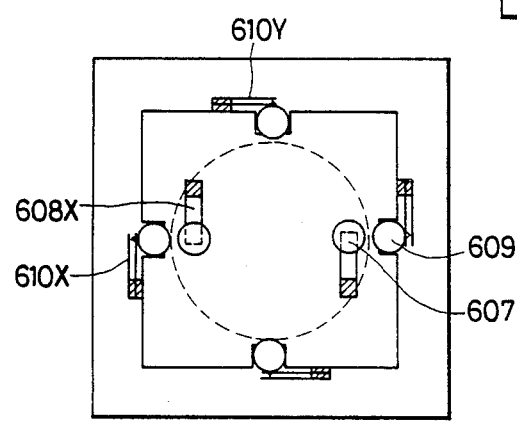
Figure 32:
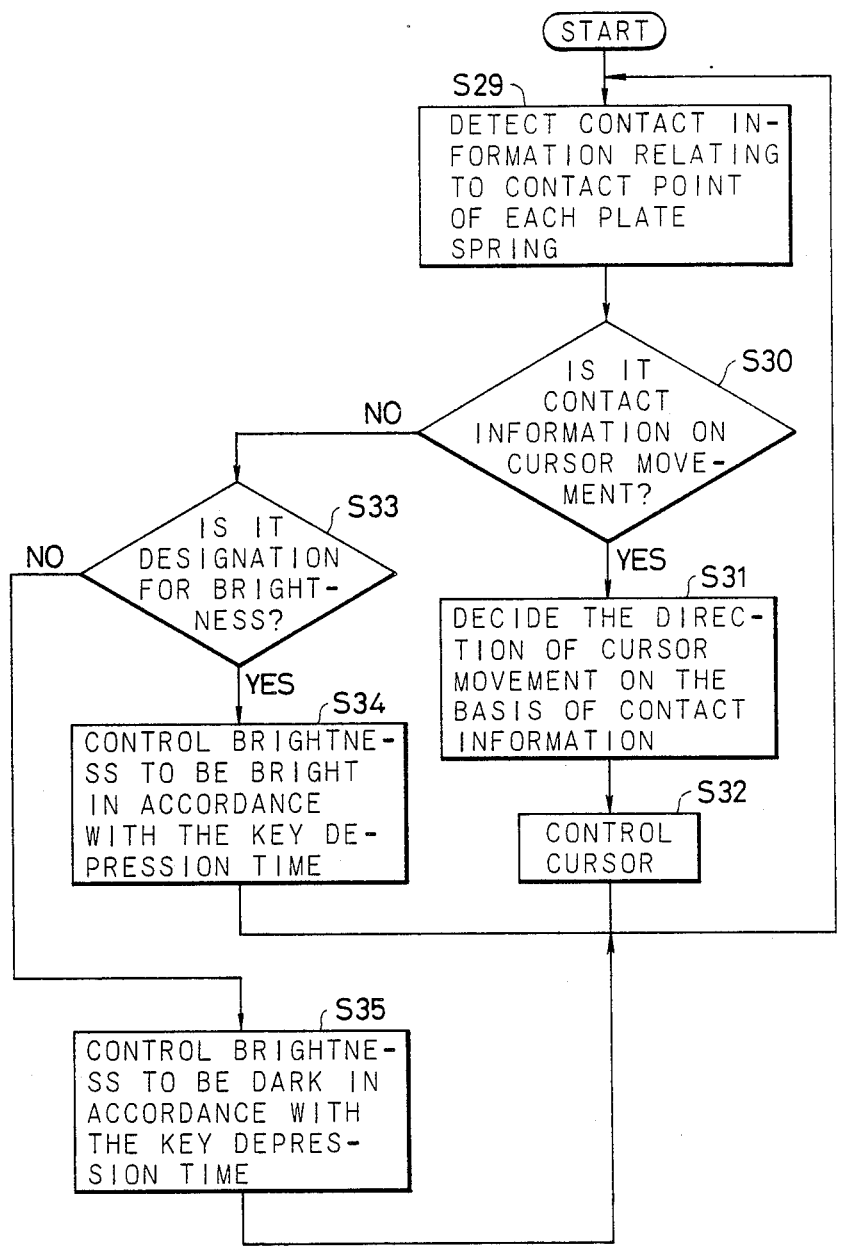
FIG. 32 shows a control flowchart of the switch shown in FIG. 29.

The structure of the cursor movement control key switch 604 is shown in FIG. 31(E).

It is noted that commercially available switches may be used in place of the pressure balls 607 and 609 and the plate spring contacts 608 and 610 in the seventh embodiment described above.

In the seventh embodiment of the present invention described above, control input for cursor movement may be performed by operation of a single key. Furthermore, the brightness of the display portion may be freely adjusted by the same key. Therefore, if the ambient brightness changes abruptly, the brightness of the display portion may be readily changed. The cursor may be moved while the operator observes the display portion, resulting in fast and efficient operation. Control operations as described above may be performed at a remote location from the keyboard portion of the main body, resulting in convenience. A cursor movement control key switch of the seventh embodiment has a simple structure and yet provides an excellent effect.

An eighth embodiment of the present invention will now be described with reference to FIGS. 33(A), 33(B), and 35(A) to 35(E). A cursor movement control key switch according to the eight embodiment can allow, by operation of a single key, cursor movement control as well as control of the volume level of sounds at a speaker for producing audio information relating to the cursor movement. The eighth embodiment of the present invention will be described in detail below.

Figure 33A:
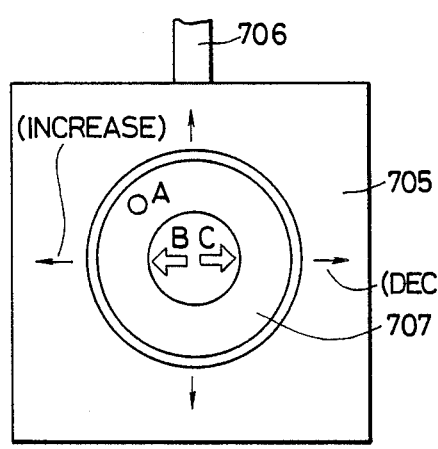
FIGS. 33(A) and 33(B) ar views for explaining the mode of operation of a cursor movement control key switch according to an eighth embodiment of the present invention.

A case will be described in which a cursor 4 on a display portion 2 is moved diagonally toward the top left according to the eighth embodiment. In FIG. 33(A), the cursor 4 may be moved by depressing vertically downward point A at the top left on a key top 707 of a key switch 705. If it is desired to increase the volume level of the sounds, the key top 707 may be kept depressed to the left (arrow B) until the desired volume level is obtained. On the other hand, if it is desired to decrease the volume level, the key top 707 may be depressed to the right (arrow C) until the desired volume level is obtained. It is noted that the cursor movement control key switch 705 and a personal computer main body are connected through a cable 706 in the eighth embodiment.

Figure 34:
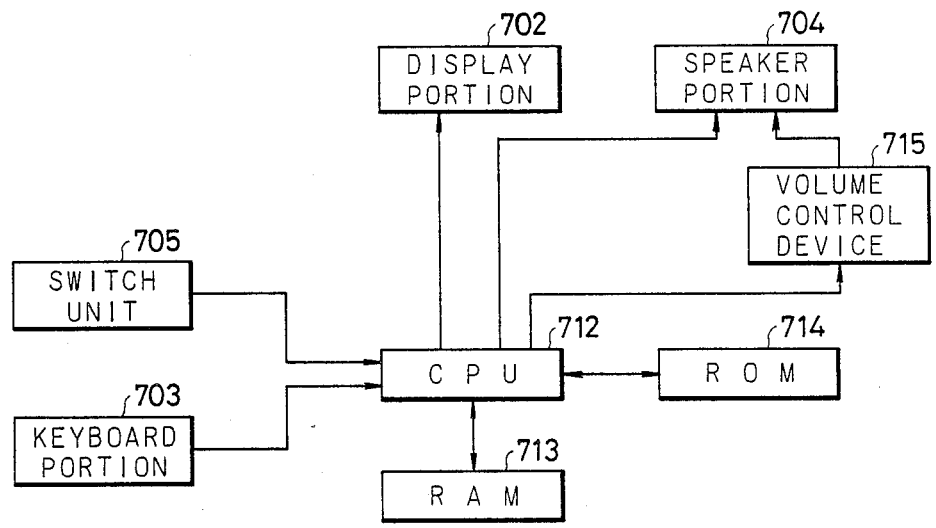
FIG. 34 is a block diagram showing the configuration of a personal computer adopting the switch shown in FIGS. 33(A) and 33(B)

The configuration of the personal computer having the cursor movement control key switch according to the eighth embodiment may be described as follows. As shown in FIG. 34, the personal computer includes a CPU 712 for main control, a ROM 714 storing a program, a RAM 713 to be used by the CPU 714, and a volume control device 715 for changing the volume level of the sounds at a speaker portion 704. A display portion 702, a keyboard portion 703 and a switch unit or a cursor movement control key switch 705 according to the seventh embodiment are connected to the CPU 712.

Figure 35A:
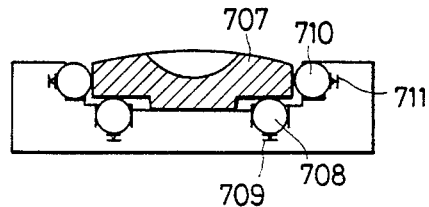
FIGS. 35(A) to 35(C) are sectional views.
Figure 35B:
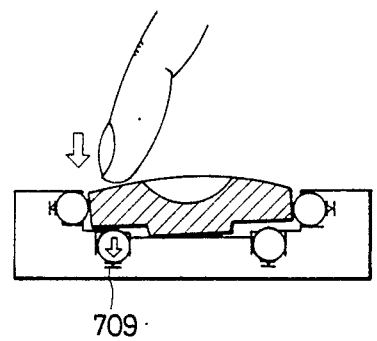
Figure 35C:
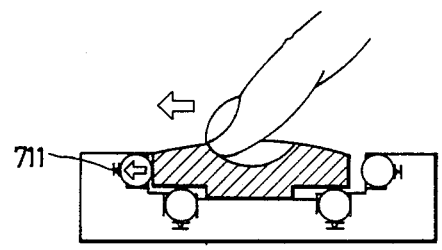
Figure 35D:
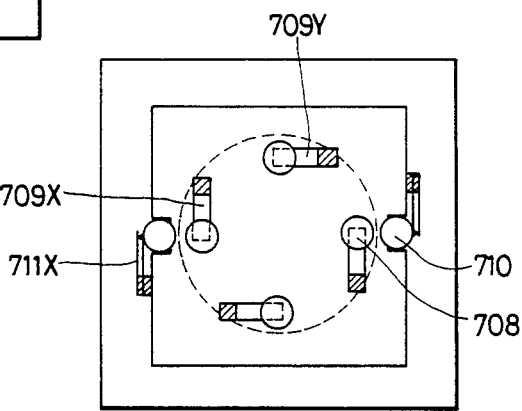
FIGS. 35(D) and 35(E) are plan views of the switch shown in FIGS. 33(A) and 33(B)
Figure 36:
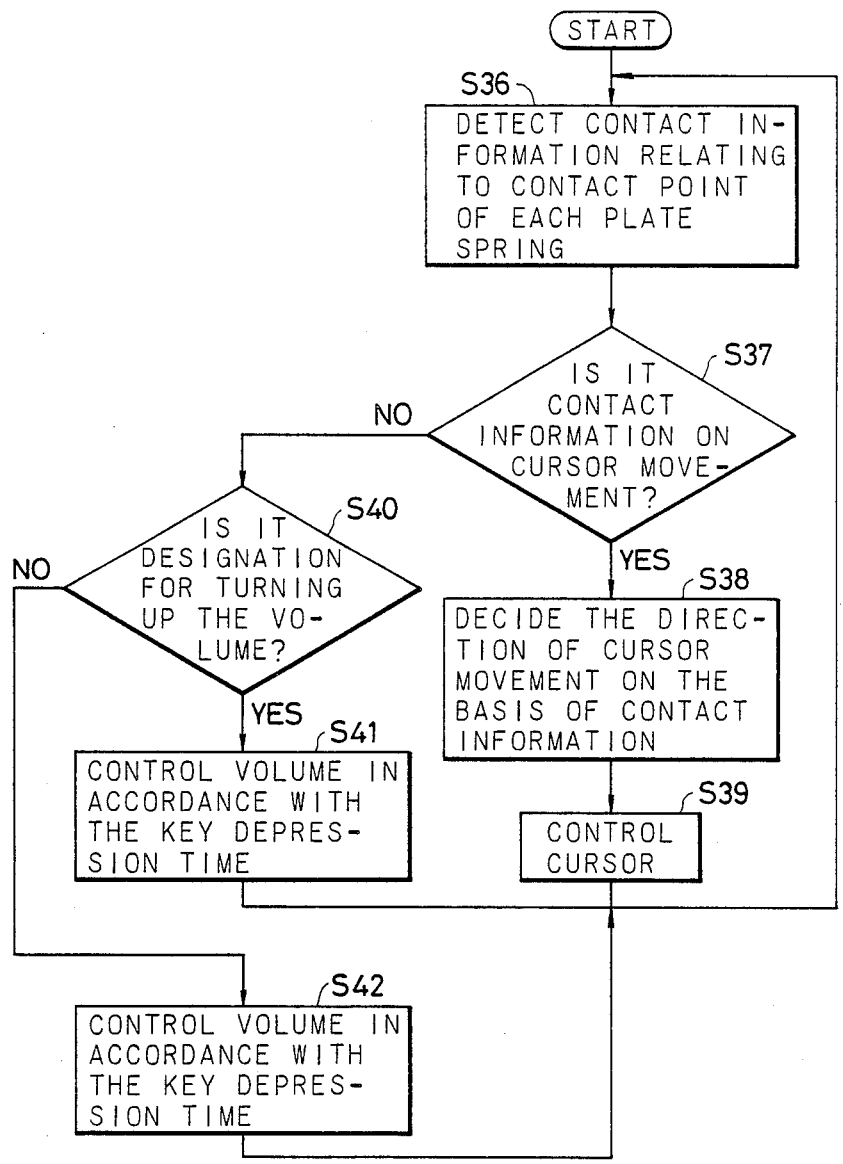
FIG. 36 shows a control flowchart of the switch shown in FIGS. 33(A) and 33(B)

The structure of the cursor movement control key switch 705 will be described. As shown in FIG. 35(A), spherical pressure balls 708 and plate spring contacts 709 ($709_x$, $709_y$ and so on) are disposed below the key top 707. When the downward force acts on the key top 707, the corresponding plate spring contact 709 closes. The contact information is detected by the CPU 712 as may be seen from the flowchart shown in FIG. 36. The contact information thus detected is discriminated as the contact information for movement control of the cursor, and the direction of the cursor movement to be made is decided on the basis of such contact information. Thus, the direction of movement of the cursor 4 is controlled. If the key top 707 is depressed vertically downward at a point corresponding to no one of the plate spring contacts 709, such as point A, the force acts on both plate spring contacts $709_x$ and $709_y$ to allow their contact. The CPU 712 detects the contact information and the direction of movement of the cursor is decided. The cursor 4 may then be moved diagonally toward the top left.

Similarly, spherical pressure balls 710 and plate spring contacts 711 ($711_x$ and $711_y$) are disposed around the key top 707. When the horizontal force acts on the key top 707, the corresponding plate spring contact 711 contacts. The contact information thus obtained is detected by the CPU 712. The CPU 712 discriminates that the contact information is information for changing the volume level. The volume level at the speaker portion 704 is controlled through the volume control device 715. The volume control device 715 can adjust the voltage applied to the speaker portion 704 in accordance with the signal supplied from the CPU 712. When the key top 707 is depressed in the direction indicated by arrow B in FIG. 33(A), for example, the force acts on a plate spring contact $711_x$ shown in FIG. 35(D) to allow its contact. The corresponding information is discriminated to be information for changing the volume in the increasing sense. Then, the CPU 712 controls the volume control device 715 so as to increase the volume level of the sounds at the speaker portion 704.

The volume level of the sounds at the speaker portion 704 is decided in accordance with the contact time of the plate spring contact, that is, the depression time of the key top. In order to decrease the volume, the key top 707 may be depressed in the direction indicated by arrow C in FIG. 33(A) to perform similar control.

The means for detecting release and closure of the plate spring contacts 709 and 711 is similar to that described with reference to FIGS. 20(E) and 20(F).

The CPU 712 periodically examines the terminals of the plate spring contacts 709 and 711.

The direction of movement of the cursor 4 to be made may be detected by monitoring the terminals of the four plate spring contacts 709, while the increase/decrease in the volume level of the sounds at the speaker portion 704 may be detected by monitoring the terminals of the two plate spring contacts 711. If the contact information obtained periodically in this manner is the same, the CPU 712 repeats the same control operation.

Figure 33B:
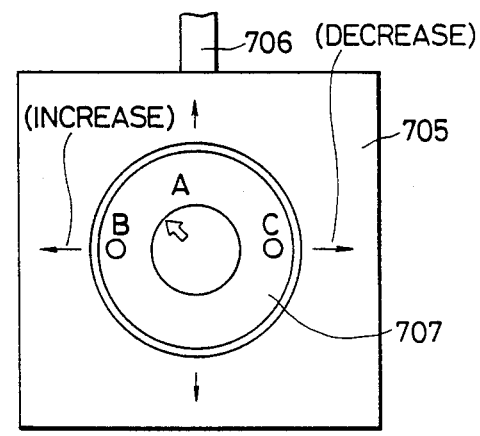

The structure of the key switch of the eighth embodiment of the present invention has symmetry. Therefore, an output signal for cursor movement control is generated in response to a horizontal sliding displacement of the key top 707, while a output signal for volume control is generated in response to selective downward depression displacement of the key top 707. The cursor 4 may be moved by simply depressing the key top 707 of the cursor movement key switch 705 diagonally toward the top left (arrow A), as shown in FIG. 33(B).

If it is desired to increase the volume level, the left portion (point B) of the key top 707 is depressed downward until a desired volume level is achieved. In order to decrease the volume level, the right portion (point C) of the key top 707 is depressed downward until a desired volume level is achieved.

Figure 35E:
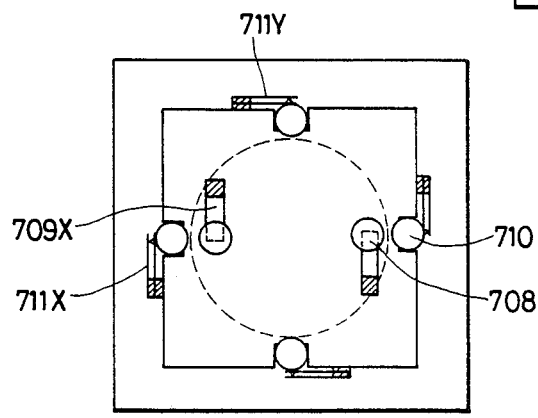

The structure of the cursor movement control key switch 705 is shown in FIG. 35(E).

In the eighth embodiment of the present invention described above, control input for cursor movement may be performed by operation of a single key. Furthermore, the volume level at the speaker portion may be freely adjusted by the same key. Therefore, if the ambient noise environment changes abruptly, the volume level of the sounds at the speaker portion may be readily changed. The cursor may be moved while an operator observes the display portion, resulting in fast and efficient operation. Control operations as described above may be performed at a remote location from the keyboard portion of the main body through a cable, resulting in convenience. A cursor movement control key switch of the eighth embodiment has a simple structure and yet provides an excellent effect.

A ninth embodiment of the present invention will now be described which utilizes a cursor movement control key switch according to the fourth, sixth, seventh or eighth embodiment of the present invention. A cursor movement control key switch according to the ninth embodiment allows cursor movement control as well as free selection between high and low speed movement of the cursor by operation of a single key. The ninth embodiment of the present invention will be described in detail below.

Figure 37A:
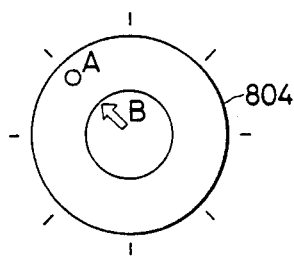
FIGS. 37(A) and 37(B) are views for explaining the mode of operation of a cursor movement control key switch according to a ninth embodiment of the present invention.

A case will be described in which a cursor 4 on a display portion 2 is moved diagonally toward the top left according to the ninth embodiment. In FIG. 37(A), the cursor 4 may be moved by depressing vertically downward point A at the top left of a cursor movement control key switch 804. Then, the cursor 4 starts moving diagonally toward the top left. When the cursor 4 reaches a point near the point A, the key switch 804 may be depressed toward the top left (arrow B) instead of depressing the point A. Then, the moving speed of the cursor 4 is changed to the low speed in units of unit scales. Thus, the cursor 4 may be moved to the desired point.

Figure 38A:
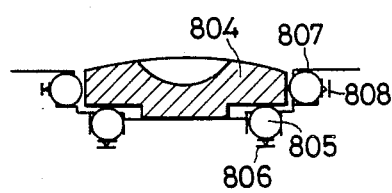
FIGS. 38(A) to 38(C) are sectional views and FIG. 38(D) is a plan view of the switch shown in FIG. 37.
Figure 38B:
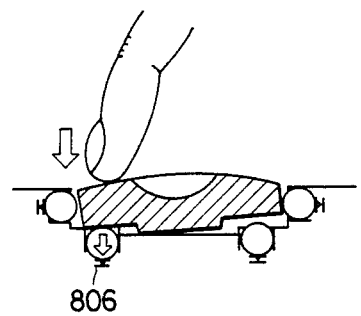
Figure 38C:
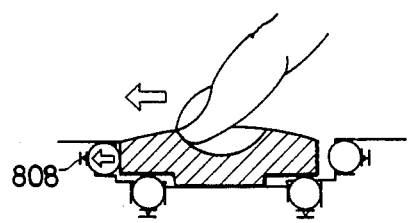
Figure 39:
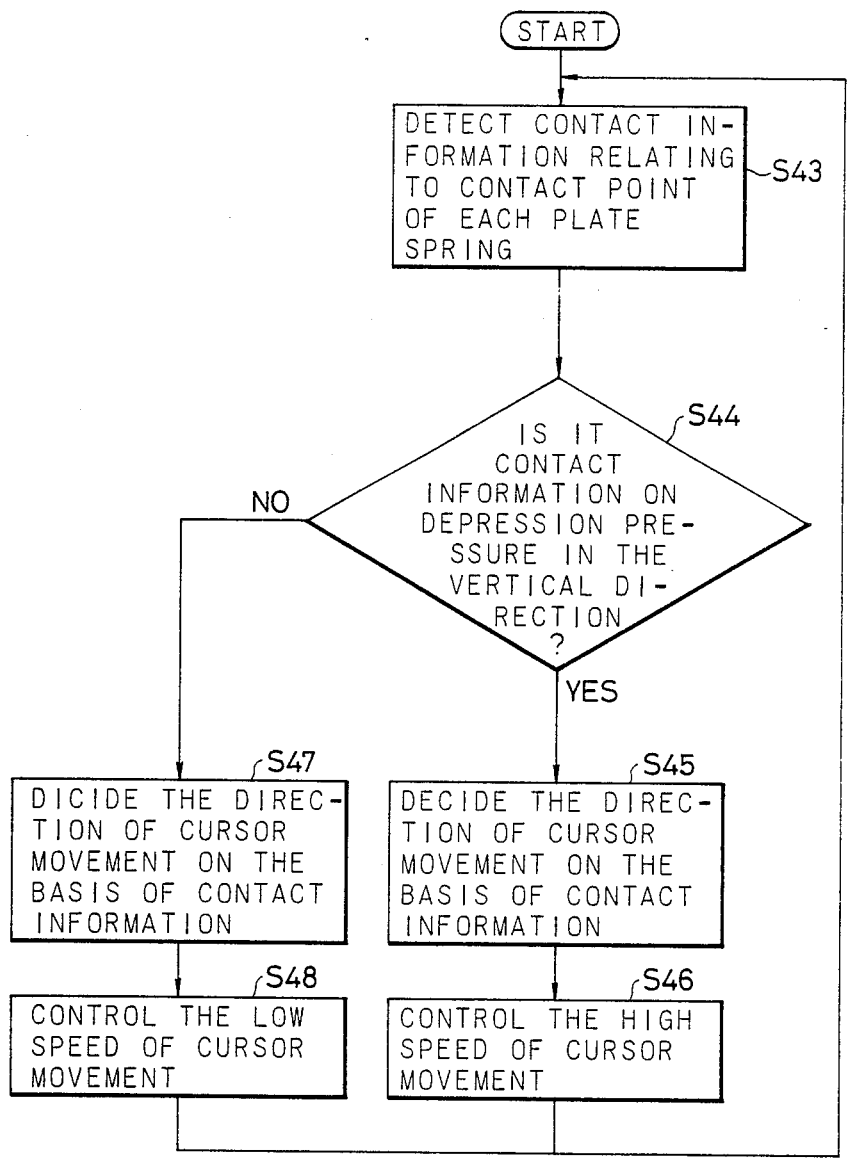
FIG. 39 shows a control flowchart of the switch shown in FIG. 37.

The structure of the cursor movement control key switch 804 will be described. As shown in FIG. 38(A), spherical pressure balls 805 and plate spring contacts 806 ($806_x$, $806_y$ and so on) are disposed below the key switch 804. When the downward force acts on the key top switch 804, the corresponding plate spring contact 806 contacts. The contact information is detected by the CPU 9 as may be seen from FIG. 8(A) and the flow-chart shown in FIG. 39. The contact information thus detected is discriminated as the contact information for high speed movement control of the cursor, and high speed movement and the direction of the cursor movement to be made is decided on the basis of such contact information. Thus, the direction of rapid movement of the cursor 4 is controlled. If the key switch 804 is depressed vertically downward at a point corresponding to no one of the plate spring contacts 806, such as point A, the force acts on both plate spring contacts $806_x$ and $806_y$ to allow their contact. The CPU 712 detects the contact information and the moving speed of the cursor is decided. The cursor 4 may then be moved at high speed diagonally toward the top left.

Similarly, spherical pressure balls 807 and plate spring contacts 808 ($808_x$, $808_y$ and so on) are disposed around the key switch 804. When the horizontal force acts on the key switch 804, the corresponding plate spring contact 808 closes. The contact information thus obtained is detected by the CPU 9. The CPU 9 discriminates that the contact information is information for changing the moving speed of the cursor to the low speed since the contact information does not correspond to vertical downward depression of the key switch 804. The high or low speed of movement of the cursor is controlled.

Figure 38D:
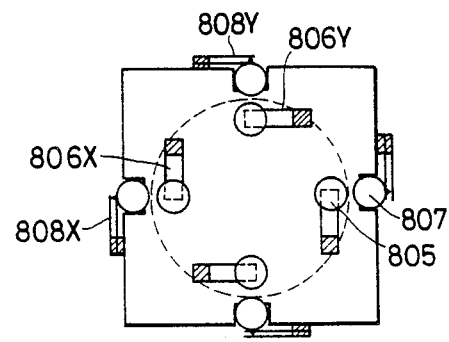

When the key switch 804 is depressed in a direction corresponding to no one of the plate spring contacts 808, such as the direction indicated by arrow B in FIG. 37(A), the force acts on both plate spring contacts $808_x$ and $808_y$ shown in FIG. 38(D). The corresponding cursor information is detected by the CPU 9 as information for moving the cursor at the slow speed.

The means for detecting release and closure of the plate spring contacts 806 and 808 is similar to that described with reference to FIGS. 20(E) and 20(F).

The CPU 9 periodically examines the terminals of the plate spring contacts 806 and 808.

The direction of movement and rapid speed movement of the cursor 4 to be made may be detected by monitoring the terminals of the four plate spring contacts 806, while the direction of movement and slow speed movement of the cursor 4 to be made may be detected by monitoring the terminals of the four plate spring contacts 808. If the contact information obtained periodically in this manner is the same, the CPU 9 repeats the same control operation.

Figure 37B:
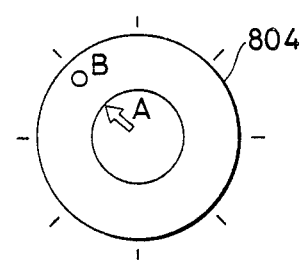

The structure of the key switch of the ninth embodiment of the present invention has symmetry. Therefore, an output signal for moving the cursor at low speed is generated in response to a vertical depression of the key switch, while an output signal for moving the cursor at high speed is generated in response to a horizontal sliding displacement of the key switch. The cursor 4 may be moved a high speed by simply depressing the key switch 804 diagonally toward the top left (arrow A), as shown in FIG. 37(B). When the cursor 4 reaches a point near point (a), the top left (point B) of the switch 804 is depressed downward. Then, the cursor 4 moves at low speed in units of unit scales and can be precisely positioned on point (a). The structure of the cursor movement control key switch 804 is shown in FIG. 38(E).

According to the ninth embodiment described above, control input for moving the cursor at high speed on the display portion may be performed by operation of a single key. At the same time, control input for moving the cursor at high or low speed may also be performed by the same key. Therefore, an unskilled operator may be able to move the cursor fast and precisely while observing the display portion. A cursor movement control key switch of the ninth embodiment of the present invention has a simple structure and yet provides an excellent effect.

What is claimed is:
1. A cursor movement control key comprising:
a key top mounted for displacement in a plane and for depression movement in a direction perpendicular to the plane;
a plurality of first balls mounted to be moved by the movement of said key top in said plane;
a plurality of second balls mounted to be moved by depression movement of said key top in the direction perpendicular to said plane;
a plurality of first detection means for detecting the displacement of said plurality of first balls; and
a plurality of second detection means for detecting the displacement of said plurality of second balls.
2. A cursor movement control key according to claim 1, further comprising cursor control means for moving a cursor in accordance with a direction of movement of said key top detected by the first detection means.
3. A cursor movement control key according to claim 1, further comprising control means for changing the size of a cursor in accordance with a depression movement of said key top detected by the second detection means.
4. A cursor movement control key according to claim 1, further comprising means for returning said key top to a normal position in the plane and from depressed movement.

* * * * *

UNITED STATES PATENT AND TRADEMARK OFFICE
CERTIFICATE OF CORRECTION

PATENT NO. : 4,931,781
DATED : June 5, 1990
INVENTOR(S) : Akira Miyakawa

It is certified that error appears in the above-identified patent and that said Letters Patent is hereby corrected as shown below:

TITLE PAGE:

[56] References Cited:

OTHER PUBLICATIONS:

"Disclosur" should read --Disclosure--.

COLUMN 2:

Line 63, "plan" should read --plan view--.

COLUMN 3:

Line 1, "diagram" should read --diagrams--.

Line 7, "sectional" should read --sectional views--.

COLUMN 4:

Line 14, "mean" should read --means--.

COLUMN 6:

Line 36, "105," should read --$105_1$,--.

UNITED STATES PATENT AND TRADEMARK OFFICE
CERTIFICATE OF CORRECTION

PATENT NO. : 4,931,781
DATED : June 5, 1990
INVENTOR(S) : Akira Miyakawa

It is certified that error appears in the above-identified patent and that said Letters Patent is hereby corrected as shown below:

COLUMN 7:

Line 9, "ma" should read --may--.

COLUMN 9:

Line 11, "$211_2$"" should read --$211_{t2}$--.

Figure 22:
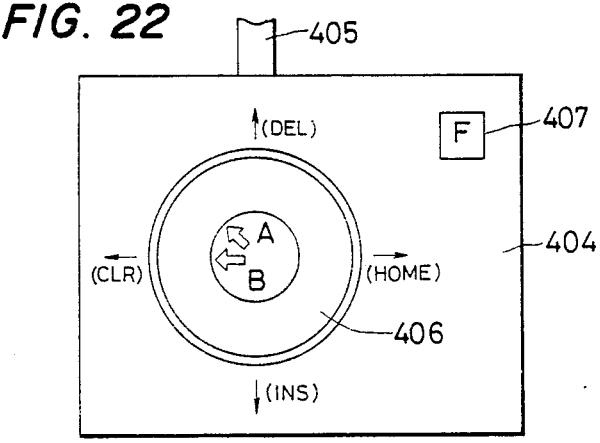
FIG. 22 is a view for explaining the mode of operation of a cursor movement control key switch according to a fifth embodiment of the present invention.

COLUMN 12:

Line 31, "FIG. 20" should read --FIG. 22--.

Line 66, "give" should read --given--.

Signed and Sealed this

Twenty-fifth Day of August, 1992

*Attest:*

DOUGLAS B. COMER

*Attesting Officer*　　　Acting Commissioner of Patents and Trademarks